(12) United States Patent
Le

(10) Patent No.: US 10,635,122 B2
(45) Date of Patent: Apr. 28, 2020

(54) VOLTAGE REGULATED AC POWER SUPPLY SYSTEMS AND METHODS

(71) Applicant: Alpha Technologies Inc., Bellingham, WA (US)

(72) Inventor: Thanh Le, Ferndale, WA (US)

(73) Assignee: ALPHA TECHNOLOGIES SERVICES, INC., Bellingham, WA (US)

( * ) Notice: Subject to any disclaimer, the term of this patent is extended or adjusted under 35 U.S.C. 154(b) by 0 days.

(21) Appl. No.: 16/036,725

(22) Filed: Jul. 16, 2018

(65) Prior Publication Data
US 2019/0018437 A1 Jan. 17, 2019

Related U.S. Application Data

(60) Provisional application No. 62/532,896, filed on Jul. 14, 2017.

(51) Int. Cl.
*G05F 1/14* (2006.01)
*H02J 9/06* (2006.01)
*H02J 3/38* (2006.01)
*H02M 5/10* (2006.01)

(52) U.S. Cl.
CPC ............... *G05F 1/14* (2013.01); *H02J 3/383* (2013.01); *H02J 9/062* (2013.01); *H02J 2009/067* (2013.01); *H02M 5/10* (2013.01)

(58) Field of Classification Search
CPC .......... H02M 5/10; H02M 5/22; H02M 5/225; H02M 5/257; H02M 5/2573;
(Continued)

(56) References Cited

U.S. PATENT DOCUMENTS

| 352,105 A | 11/1886 | Zipernowsky et al. |
| 375,614 A | 12/1887 | Eickemeyer |

(Continued)

FOREIGN PATENT DOCUMENTS

| AU | 687528 B | 12/1995 |
| AU | 2029495 A | 12/1995 |

(Continued)

OTHER PUBLICATIONS

Smart Powershop/Smart Energy Systems International AG, "Off-Grid SMA Power Set XS," Sep. 29, 2010, 5 pages.
(Continued)

*Primary Examiner* — Bryan R Perez
(74) *Attorney, Agent, or Firm* — Michael R. Schacht; Schacht Law Office, Inc.

(57) ABSTRACT

A power supply system comprises a primary regulation system, a secondary regulation system, and a controller. The primary regulation system comprises a primary transformer and a primary tap switch array. The secondary regulation system comprising a secondary transformer and an adjustment power signal generator. The controller is configured to control the adjustment power signal generator to apply an adjustment power signal to the secondary transformer. The secondary transformer is configured to combine the adjustment power signal with a base power supply signal from the primary transformer.

11 Claims, 8 Drawing Sheets

(58) Field of Classification Search
CPC ...... H02J 2009/067; H02J 9/062; H02J 9/383;
G05F 1/14
USPC ........ 363/40, 41, 43, 55, 65, 71, 72, 95, 97,
363/98, 131, 132, 35–37, 135, 136, 137,
363/148, 149, 153, 154, 155, 157, 171;
323/255, 256, 340, 341, 342, 251, 253,
323/258, 259, 262, 264; 307/66, 64
See application file for complete search history.

(56) References Cited

U.S. PATENT DOCUMENTS

| | | |
|---|---|---|
| 414,266 A | 11/1889 | Thomson |
| 1,718,238 A | 6/1929 | Kettering et al. |
| 1,950,396 A | 3/1934 | Boucher |
| 2,007,415 A | 7/1935 | Walker |
| 2,014,101 A | 9/1935 | Bryan |
| 2,037,183 A | 4/1936 | Strieby |
| 2,037,188 A | 4/1936 | Russell |
| 2,036,994 A | 12/1936 | Frank et al. |
| 2,063,994 A | 12/1936 | Frank et al. |
| 2,085,072 A | 6/1937 | Bobe |
| 2,165,969 A | 7/1939 | Humbert et al. |
| 2,240,123 A | 4/1941 | Shoup et al. |
| 2,302,192 A | 11/1942 | Dannheiser |
| 2,352,073 A | 6/1944 | Boucher et al. |
| 2,427,678 A | 9/1947 | Laging |
| 2,444,794 A | 7/1948 | Uttal et al. |
| 2,512,976 A | 6/1950 | Smeltzly |
| 2,688,704 A | 9/1954 | Christenson |
| 2,856,543 A | 10/1958 | Dixon et al. |
| 2,920,211 A | 1/1960 | Gotoh |
| 2,996,656 A | 8/1961 | Sola |
| 3,022,458 A | 2/1962 | Sola |
| 3,064,195 A | 11/1962 | Freen |
| 3,221,172 A | 11/1965 | Rolison |
| 3,283,165 A | 11/1966 | Bloch |
| 3,293,445 A | 12/1966 | Levy |
| 3,304,599 A | 2/1967 | Nordin |
| 3,305,762 A | 2/1967 | Geib, Jr. |
| 3,339,080 A | 8/1967 | Howald |
| 3,345,517 A | 10/1967 | Smith |
| 3,348,060 A | 10/1967 | Jamieson |
| 3,389,329 A | 6/1968 | Quirk et al. |
| 3,435,358 A | 3/1969 | Rheinfelder |
| 3,458,710 A | 7/1969 | Dodge |
| 3,521,152 A | 7/1970 | Emerson |
| 3,525,035 A | 8/1970 | Kakalec |
| 3,525,078 A | 8/1970 | Baggott |
| 3,546,571 A | 12/1970 | Fletcher et al. |
| 3,590,362 A | 6/1971 | Kakalec |
| 3,636,368 A | 1/1972 | Sia |
| 3,678,284 A | 7/1972 | Peters |
| 3,678,377 A | 7/1972 | Chiffert |
| 3,686,561 A | 8/1972 | Spreadbury |
| 3,691,393 A | 9/1972 | Papachristou |
| 3,737,858 A | 6/1973 | Turner et al. |
| 3,742,251 A | 6/1973 | Thompson et al. |
| 3,823,358 A | 7/1974 | Rey |
| 2,860,748 A | 1/1975 | Everhart et al. |
| 3,859,589 A | 1/1975 | Rush |
| 3,860,748 A | 1/1975 | Everhart et al. |
| 3,873,846 A | 3/1975 | Morio et al. |
| 3,909,560 A | 9/1975 | Martin et al. |
| 3,916,295 A | 10/1975 | Hunter |
| 3,938,033 A | 2/1976 | Borkovitz et al. |
| 3,943,447 A | 3/1976 | Shomo, III |
| 4,004,110 A | 1/1977 | Whyte |
| 4,010,381 A | 3/1977 | Fickenscher et al. |
| 4,060,844 A | 11/1977 | Davis et al. |
| 4,122,382 A | 10/1978 | Bernstein |
| 4,130,790 A | 12/1978 | Heisey |
| 4,170,761 A | 10/1979 | Koppehele |
| 4,198,624 A | 4/1980 | Watanabe |
| 4,217,533 A | 8/1980 | Van Beek |
| 4,251,736 A | 2/1981 | Coleman |
| 4,262,245 A | 4/1981 | Wendt |
| 4,270,080 A | 5/1981 | Kostecki |
| 4,277,692 A | 7/1981 | Small |
| 4,295,053 A | 10/1981 | Kovatch et al. |
| 4,295,054 A | 10/1981 | Kovatch et al. |
| 4,313,060 A | 1/1982 | Fickenscher et al. |
| 4,353,014 A | 10/1982 | Willis |
| 4,366,389 A | 12/1982 | Hussey |
| 4,366,390 A | 12/1982 | Rathmann |
| 4,385,263 A | 5/1983 | Luz et al. |
| 4,400,624 A | 8/1983 | Ebert, Jr. |
| 4,400,625 A | 8/1983 | Hussey |
| 4,423,379 A | 12/1983 | Jacobs et al. |
| 4,446,458 A | 5/1984 | Cook |
| 4,460,834 A | 7/1984 | Gottfried |
| 4,466,041 A | 8/1984 | Witulski et al. |
| 4,472,641 A | 9/1984 | Dickey et al. |
| 4,475,047 A | 10/1984 | Ebert |
| 4,477,799 A | 10/1984 | Rocci et al. |
| 4,510,401 A | 4/1985 | Legoult |
| 4,604,530 A | 8/1986 | Shibuya |
| 4,616,305 A | 10/1986 | Damiano et al. |
| 4,628,426 A | 12/1986 | Steigerwald |
| 4,631,471 A | 12/1986 | Fouad et al. |
| 4,656,412 A | 4/1987 | McLyman |
| 4,670,702 A | 6/1987 | Yamada et al. |
| 4,673,825 A | 6/1987 | Raddi et al. |
| 4,686,375 A | 8/1987 | Gottfried |
| 4,697,134 A | 9/1987 | Burkum et al. |
| 4,700,122 A | 10/1987 | Cimino et al. |
| 4,709,318 A | 11/1987 | Gephart et al. |
| 4,719,427 A | 1/1988 | Morishita et al. |
| 4,719,550 A | 1/1988 | Powell et al. |
| 4,775,800 A | 1/1988 | Wood |
| 4,724,290 A | 2/1988 | Campbell |
| 4,724,478 A | 2/1988 | Masuko et al. |
| 4,730,242 A | 3/1988 | Divan |
| 4,733,223 A | 3/1988 | Gilbert |
| 4,740,739 A | 4/1988 | Quammen et al. |
| 4,745,299 A | 5/1988 | Eng et al. |
| 4,748,341 A | 5/1988 | Gupta |
| 4,748,342 A | 5/1988 | Dijkmans |
| 4,763,014 A | 8/1988 | Model et al. |
| 4,791,542 A | 12/1988 | Piaskowski |
| 4,829,225 A | 5/1989 | Podrazhansky et al. |
| 4,860,185 A | 8/1989 | Brewer et al. |
| 4,864,483 A | 9/1989 | Divan |
| 4,882,717 A | 11/1989 | Hayakawa et al. |
| 4,885,474 A | 12/1989 | Johnstone et al. |
| 4,890,213 A | 12/1989 | Seki |
| 4,916,329 A | 4/1990 | Dang et al. |
| 4,920,475 A | 4/1990 | Rippel |
| 4,922,125 A | 5/1990 | Casanova et al. |
| 4,926,084 A | 5/1990 | Furutsu et al. |
| 4,943,763 A | 7/1990 | Bobry |
| 4,952,834 A | 8/1990 | Okada |
| 4,954,741 A | 9/1990 | Furutsu et al. |
| 4,975,649 A | 12/1990 | Bobry |
| 4,988,283 A | 1/1991 | Nagasawa et al. |
| 5,010,469 A | 4/1991 | Bobry |
| 5,017,800 A | 5/1991 | Divan |
| 5,027,264 A | 6/1991 | DeDoncker et al. |
| 5,029,285 A | 7/1991 | Bobry |
| 5,057,698 A | 10/1991 | Widener et al. |
| 5,099,410 A | 3/1992 | Divan |
| 5,137,020 A | 8/1992 | Wayne et al. |
| 5,148,043 A | 9/1992 | Grata et al. |
| 5,154,986 A | 10/1992 | Takechi et al. |
| 5,168,205 A | 12/1992 | Kan et al. |
| 5,172,009 A | 12/1992 | Mohan |
| 5,185,536 A | 2/1993 | Johnson, Jr. et al. |
| 5,193,067 A | 3/1993 | Sato et al. |
| 5,198,698 A | 3/1993 | Paul et al. |
| 5,198,970 A | 3/1993 | Kawabata et al. |
| 5,200,586 A | 4/1993 | Smith et al. |
| 5,200,643 A | 4/1993 | Brown |
| 5,218,522 A * | 6/1993 | Phelps ................ H02M 3/3374 |
| | | 363/124 |

(56) References Cited

U.S. PATENT DOCUMENTS

| | | |
|---|---|---|
| 5,220,597 A | 6/1993 | Horiuchi |
| 5,224,025 A | 6/1993 | Divan et al. |
| 5,229,650 A | 7/1993 | Kita et al. |
| 5,237,208 A | 8/1993 | Tominaga et al. |
| 5,241,591 A | 8/1993 | Saji |
| 5,281,919 A | 1/1994 | Palanisamy |
| 5,302,858 A | 4/1994 | Folts |
| 5,334,057 A | 8/1994 | Blackwell |
| 5,400,005 A | 3/1995 | Bobry |
| 5,402,053 A | 3/1995 | Divan et al. |
| 5,410,720 A | 4/1995 | Osterman |
| 5,440,179 A | 8/1995 | Severinsky |
| 5,457,377 A | 10/1995 | Jonsson |
| 5,467,384 A | 11/1995 | Skinner, Sr. |
| 5,483,463 A | 1/1996 | Qin et al. |
| 5,532,525 A | 7/1996 | Kaiser et al. |
| 5,579,197 A | 11/1996 | Mengelt et al. |
| 5,581,246 A | 12/1996 | Yarberry et al. |
| 5,602,462 A | 2/1997 | Stich et al. |
| 5,610,451 A | 3/1997 | Symonds |
| 5,635,773 A | 6/1997 | Stuart |
| 5,638,244 A | 6/1997 | Mekanik et al. |
| 5,642,002 A | 6/1997 | Mekanik et al. |
| 5,664,002 A | 9/1997 | Skinner, Sr. |
| 5,734,831 A | 3/1998 | Sanders |
| 5,739,595 A | 4/1998 | Mekanik et al. |
| 5,745,356 A | 4/1998 | Tassitino, Jr. et al. |
| 5,747,887 A | 5/1998 | Takanaga et al. |
| 5,747,888 A | 5/1998 | Zilberberg |
| 5,760,495 A | 6/1998 | Mekanik |
| 5,768,117 A | 6/1998 | Takahashi et al. |
| 5,783,932 A | 7/1998 | Namba et al. |
| 5,790,391 A | 8/1998 | Stich et al. |
| 5,804,890 A | 9/1998 | Kakalec et al. |
| 5,844,327 A | 12/1998 | Batson |
| 5,845,190 A | 12/1998 | Bushue et al. |
| 5,880,536 A | 3/1999 | Mardirossian |
| 5,892,431 A | 4/1999 | Osterman |
| 5,897,766 A | 4/1999 | Kawatsu |
| 5,901,057 A | 5/1999 | Brand et al. |
| 5,925,476 A | 7/1999 | Kawatsu |
| 5,961,604 A | 10/1999 | Anderson et al. |
| 5,982,412 A | 11/1999 | Nulty |
| 5,982,645 A | 11/1999 | Levran et al. |
| 5,982,652 A | 11/1999 | Simonelli et al. |
| 5,994,793 A | 11/1999 | Bobry |
| 5,994,794 A | 11/1999 | Wehrlen |
| 6,011,324 A | 1/2000 | Kohlstruck et al. |
| 6,014,015 A | 1/2000 | Thorne et al. |
| 6,028,414 A | 2/2000 | Chouinard et al. |
| 6,069,412 A | 5/2000 | Raddi et al. |
| 6,074,246 A | 6/2000 | Seefeldt et al. |
| 6,100,665 A | 8/2000 | Alderman |
| 6,198,178 B1 | 3/2001 | Schienbein et al. |
| 6,212,081 B1 | 4/2001 | Sakai |
| 6,218,744 B1 | 4/2001 | Zahrte et al. |
| 6,288,456 B1 | 9/2001 | Cratty |
| 6,288,916 B1 | 9/2001 | Liu et al. |
| 6,295,215 B1 | 9/2001 | Faria et al. |
| 6,344,985 B1 | 2/2002 | Akerson |
| 6,348,782 B1 | 2/2002 | Oughton et al. |
| 6,426,610 B1 | 7/2002 | Janik |
| 6,433,905 B1 | 8/2002 | Price et al. |
| 6,456,036 B1 | 9/2002 | Thandiwe |
| 6,465,910 B2 | 10/2002 | Young et al. |
| 6,486,399 B1 | 11/2002 | Armstrong et al. |
| 6,602,627 B2 | 8/2003 | Liu et al. |
| 6,738,435 B1 | 5/2004 | Becker |
| 6,768,722 B1 | 7/2004 | Katseff et al. |
| 6,841,971 B1 | 1/2005 | Spée et al. |
| 6,906,933 B2 | 6/2005 | Taimela |
| 6,933,626 B2 | 8/2005 | Oughton |
| 7,040,920 B2 | 5/2006 | Johnson et al. |
| 7,043,049 B2 | 5/2006 | Kuzma |
| 7,102,251 B2 | 9/2006 | West |
| 7,182,632 B1 | 2/2007 | Johnson et al. |
| 7,449,798 B2 | 11/2008 | Suzuki et al. |
| 7,543,328 B2 | 6/2009 | Bialk et al. |
| 7,567,520 B2 | 7/2009 | Ostrosky |
| 7,835,379 B2 | 11/2010 | Dravida et al. |
| 8,074,888 B2 | 12/2011 | Naccache |
| 8,344,685 B2 | 1/2013 | Bertness et al. |
| 8,575,779 B2 | 11/2013 | Le et al. |
| 8,616,457 B2 | 12/2013 | Krawczewicz et al. |
| 9,030,045 B2 | 5/2015 | Richardson et al. |
| 9,030,048 B2 | 5/2015 | Heidenreich et al. |
| 9,234,916 B2 | 1/2016 | Peck et al. |
| 9,312,726 B2 | 4/2016 | Heidenreich et al. |
| 9,633,781 B2 | 4/2017 | Le et al. |
| 9,812,900 B2 | 11/2017 | Richardson et al. |
| 9,881,625 B2 | 1/2018 | Liu et al. |
| 10,355,521 B2 | 7/2019 | Richardson et al. |
| 2001/0033502 A1 | 10/2001 | Blair et al. |
| 2003/0046706 A1 | 3/2003 | Rakib |
| 2003/0048006 A1 | 3/2003 | Shelter et al. |
| 2004/0031059 A1 | 2/2004 | Bialk et al. |
| 2004/0207366 A1 | 10/2004 | Sung |
| 2005/0096772 A1 | 5/2005 | Cox et al. |
| 2005/0152517 A1 | 7/2005 | Binder |
| 2005/0258927 A1 | 11/2005 | Lu |
| 2006/0168612 A1 | 7/2006 | Chapman et al. |
| 2007/0002875 A1 | 1/2007 | Rocci et al. |
| 2007/0057651 A1* | 3/2007 | Hoffman ............... G05F 1/147 323/258 |
| 2007/0262650 A1 | 11/2007 | Li |
| 2008/0024268 A1 | 1/2008 | Wong et al. |
| 2008/0203820 A1 | 8/2008 | Kramer et al. |
| 2008/0278006 A1 | 11/2008 | Gottlieb et al. |
| 2009/0076661 A1 | 3/2009 | Pearson et al. |
| 2009/0196082 A1 | 8/2009 | Mazumder et al. |
| 2009/0240377 A1 | 9/2009 | Batzler et al. |
| 2010/0008397 A1 | 1/2010 | Johnson |
| 2010/0045107 A1 | 2/2010 | Cohen et al. |
| 2010/0161259 A1 | 6/2010 | Kim et al. |
| 2010/0191387 A1 | 7/2010 | Warren et al. |
| 2010/0250192 A1 | 9/2010 | Deokar et al. |
| 2010/0324548 A1 | 12/2010 | Godara et al. |
| 2010/0328851 A1 | 12/2010 | Jurek |
| 2011/0187197 A1 | 8/2011 | Moth |
| 2011/0198932 A1* | 8/2011 | Le ..................... H01F 27/40 307/66 |
| 2011/0238345 A1 | 9/2011 | Gauthier et al. |
| 2011/0273151 A1 | 11/2011 | Lesso et al. |
| 2012/0051734 A1 | 3/2012 | Weiss et al. |
| 2012/0091811 A1 | 4/2012 | Heidenreich et al. |
| 2012/0127800 A1 | 5/2012 | Lutze et al. |
| 2012/0212051 A1 | 8/2012 | Heidenreich et al. |
| 2012/0217800 A1 | 8/2012 | Heidenreich et al. |
| 2012/0217806 A1 | 8/2012 | Heidenreich et al. |
| 2012/0217808 A1 | 8/2012 | Richardson et al. |
| 2013/0113287 A1 | 5/2013 | Singh et al. |
| 2013/0162650 A1 | 6/2013 | Marivoet et al. |
| 2013/0312020 A1 | 11/2013 | Talbert |
| 2014/0062189 A1 | 3/2014 | Le et al. |
| 2014/0254392 A1 | 9/2014 | Wolcott et al. |
| 2015/0029869 A1 | 1/2015 | Wolcott et al. |
| 2015/0142345 A1 | 5/2015 | Anderson et al. |
| 2015/0241892 A1 | 8/2015 | Gaucher et al. |
| 2015/0244211 A1 | 8/2015 | Richardson et al. |
| 2015/0365003 A1* | 12/2015 | Sadwick ............... H02M 3/28 363/21.01 |
| 2017/0229906 A1 | 8/2017 | Le et al. |
| 2018/0062427 A1 | 3/2018 | Richardson et al. |
| 2019/0079571 A1 | 3/2019 | Faley et al. |
| 2019/0081479 A1 | 3/2019 | Faley et al. |
| 2019/0140449 A1 | 5/2019 | Faley et al. |

FOREIGN PATENT DOCUMENTS

| | | |
|---|---|---|
| AU | 2015203667 B2 | 3/2017 |
| CA | 1265231 A | 1/1990 |
| CA | 2033685 A1 | 10/1991 |
| CA | 2036296 A1 | 11/1991 |
| CA | 1297546 C | 3/1992 |

(56) References Cited

FOREIGN PATENT DOCUMENTS

| | | |
|---|---|---|
| CA | 2086897 A1 | 7/1993 |
| CA | 2149845 A1 | 12/1995 |
| CA | 2168520 A1 | 8/1996 |
| CA | 2028269 A1 | 1/2000 |
| CA | 2403888 A1 | 9/2001 |
| CA | 2713017 A1 | 7/2009 |
| CA | 2504101 A1 | 5/2010 |
| CA | 2760581 A1 | 11/2010 |
| CN | 101330686 B | 3/2012 |
| DE | 2602789 A1 | 7/1977 |
| DE | 2809514 A1 | 9/1978 |
| DE | 3321649 A1 | 12/1983 |
| EP | 0284541 A2 | 9/1988 |
| EP | 0196004 B1 | 11/1993 |
| EP | 2425515 A2 | 3/2012 |
| EP | 2587620 A2 | 5/2013 |
| EP | 2858015 A1 | 4/2015 |
| FR | 762789 A | 4/1934 |
| FR | 861215 A | 2/1941 |
| GB | 188405201 A | 3/1884 |
| GB | 005201 | 4/1885 |
| GB | 260731 A | 9/1925 |
| GB | 2005118 A | 4/1979 |
| GB | 2120474 A | 11/1983 |
| GB | 2137033 A | 3/1984 |
| GB | 2171861 A | 9/1986 |
| GB | 2185326 A | 10/1986 |
| GB | 2355350 A | 4/2001 |
| GB | 2475612 A | 5/2011 |
| JP | S5482053 A | 6/1979 |
| JP | S5532133 A | 3/1980 |
| JP | S5650417 A | 5/1981 |
| JP | S56155420 A | 12/1981 |
| JP | 2000350381 A | 12/2000 |
| JP | 2001190035 A | 7/2001 |
| JP | 2005295776 A | 10/2005 |
| JP | 2010136547 A | 6/2010 |
| JP | 2010252573 A | 11/2010 |
| KR | 20070108759 A | 11/2007 |
| RU | 2191459 C1 | 10/2002 |
| RU | 2221320 C2 | 10/2004 |
| RU | 2304335 C2 | 8/2007 |
| TW | 200941897 A | 10/2009 |
| TW | I539721 B | 6/2016 |
| WO | 8501842 A1 | 4/1985 |
| WO | 0021180 A1 | 4/2000 |
| WO | 2009094540 A2 | 7/2009 |
| WO | 2010135406 A1 | 11/2010 |
| WO | 2011103131 A3 | 12/2011 |
| WO | 2012099911 A1 | 7/2012 |
| WO | 2012144127 A1 | 10/2012 |
| WO | 2012148512 A1 | 11/2012 |
| WO | 2012112252 A3 | 1/2013 |
| WO | 2013106356 A1 | 7/2013 |
| WO | 2017044970 A1 | 3/2017 |
| WO | 2019014682 A1 | 1/2019 |
| WO | 2019051321 A1 | 3/2019 |
| WO | 2019051499 A2 | 3/2019 |

OTHER PUBLICATIONS

Spears, "Disturbances Can Toast Your System," Reprint from Communications Technology, Apr. 2000, 4 pages.
Stewart Nowak, Power Problems: Selecting a UPS, Electronics Test, Jul. 13, 1990, 4 pages, No. 7, San Francisco, CA, US.
USPTO, "Final Office Action, U.S. Appl. No. 14/516,522,", dated Jan. 8, 2019, 22 pages.
Wallace et al., Wireless Load Sharing of Single Phase Telecom Inverters, Telecommunication Energy Conference, 1999, 13 pages.
Xia, Ordinary Meter Measures Battery Resistance, EDN-Design Ideas, Jun. 24, 1993, 2 pages.
Yamada, Research and Development of Telecommunications Energy Systems in NTT, NTT Integrated Infromation and Energy Systems Laboratories, Mar. 9, 2011, 8 pages.
Alpha Technologies, Inc., Cheetah CMD-N GS7000 Transponder, 2015, offer for sale 2009, 2 pages.
Alpha Technologies, Inc., Cheetah CMD-N Harmonic Transponder, 2015, offer for sale 2007, 2 pages.
Alpha Technologies, Inc., Cheetah XD Network Tracker Plus, 2015, offer for sale Nov. 2011, 2 pages.
Alpha Technologies, Inc., Power Technical Bulletin DSM3 vs DSM1 Provisioning, Dec. 2010, 4 pages.
Batson et al., Solving the Powering Requirements of Broadband Dial Tone Service, 1994, 3 pages.
Bridge et al., "Preventing outages without batteries," CED, Jun. 1999, 7 pages.
Broadband Business and News Perspective, "Cable operators feeling power surge," Reprinted from CED, Apr. 2000, 4 pages.
Cheetah Technologies, L.P., Cheetah CMD-N Arris SG4000, 2014, offer for sale Feb. 3, 2011, 2 pages.
Cheetah Technologies, L.P., Cheetah CMD-P+ DOCSIS-based Transponder for Cable Power Systems, 2014, offer for sale 2008, 3 pages.
Cheetah Technologies, L.P., CMD-P+ Transponder User Manual, Mar. 18, 2011, 88 pages.
Contino et al., Water-Cooling Applications for Telecommunications and Computer Energy Systems, Telecommunications Energy Conference, IEEE, 1988, pp. 441-447.
Electroline Equipment Inc., DOCSIS 2.0 and EuroDOCSIS Status Monitoring Transponder for Power Supplies, 2006, 2 pages.
Eto et al., Research, Development, and Demonstration Needs for Large-Scale, Reliability-Enhancing, Integration of Distributed Energy Resources, IEEE Proceedings of the 33rd Hawaii International Conference on System Sciences, 2000, 7 pages.
European Patent Office, "Extended European Search Report", Application No. 16845289.4, dated Dec. 19, 2018, 10 pages.
H.C. Gerdes et al., A Practical Approach to Understanding Ferroresonance, EEE-Circuit Design Engineering, pp. 87-89, Apr. 1966.
Hart et al, The Derivation and Application of Design Equations for Ferroresonant Voltage Regulators and Regulated Rectifiers, IEEE Transactions on Magnetics, vol. MAG-7, No. 1, Mar. 1971, pp. 205-211.
Hitron Technologies Inc., DNP-30341 DOCSIS-Based Downstream Monitor, Sep. 2012, 2 pages.
IEEE Standard for Ferroresonant Voltage Regulators, Electronics Transformer Technical Committee of the IEEE Power Electronics Society, IEEE Std. 449-1990, May 16, 1990, 29 pages.
IMEON Energy, "IMEON 3.6 User Guide", no date, 20 pages.
IMEON Energy, "Self Consumption Smart Grid Inverter", 2016, 3 pages.
IMEON Energy, "Self Consumption Smart Grid Inverter", no date, 2 pages.
IMEON Energy, "The Self Consumption Smart Grid Inverter New Generation", no date, 8 pages.
International Search Report, PCT/US99/19677, dated Feb. 8, 2000, 5 pages.
International Searching Authority, "PCT/US2011/025000", International Search Report, dated Oct. 26, 2011, 9 pages.
International Searching Authority, "PCT/US2012/021619", International Search Report, dated May 17, 2012, 7 pages.
International Searching Authority, ISR & Written Opinion, PCT/US2018/050094, dated Dec. 27, 2018, 7 pages.
International Searching Authority, ISR & Written Opinion, PCT/US2018/050500, dated Feb. 28, 2019, 6 pages.
International Searching Authority, ISR, PCT/US2012/021622, dated May 17, 2012, 7 pages.
International Searching Authority, PCT Notification of Transmittal of the International Search Report and the Written Opinion of the International Searching Authority, or the Declaration, dated Dec. 8, 2016, 8 pages.
Ivensys, "Power When You Really Need It!" Publication No. CSG29FXA, Feb. 2000, 2 pages.
Ivensys, "Sometimes Less Is More!" Publication No. CSG28FXA, Feb. 2000, 2 pages.

(56) References Cited

OTHER PUBLICATIONS

Jain et al., High Frequency Triport UPS Topologies for Emerging Fiber Networks, Telecommunications Energy Conference, IEEE, 1998, pp. 505-512.
Jefferson T. Mitchell et al., Rectifiers and Energy Conservation, Telecommunications, Mar. 1979, 3 pages.
Kakalec, "A Feedback-Controlled Ferroresonant Voltage Regulator," IEEE Transactions of Magnetics, Mar. 1970, 5 pages, vol. Mag-6, No. 1.
Lectro Products Incorporated, "Lectro Ferro Family," Publication No. CSG16FXA, Nov. 1998, 4 pages.
Lectro Products Incorporated, "Solving CATV Power Solutions," Publication No. CSG24FYA, Jun. 1999, 12 pages.
Marcotte et al., "Powering Cable TV Systems," Reprinted from Broadband Systems & Design, Jun. 1996, 4 pages.
Marcotte, "Power migration strategies for future-proofing," Reprinted from CED Magazine, Jun. 1997, 4 pages.
McGraw-Hill, Dictionary of Scientific and Technical Terms Fifth Edition, p. 745 and pp. 1696-1697, 1994.
Multipower, Inc., "Confluence Newsletters, vols. I and II," "MP 900," "MP1350," web site http://www.multipowerups.com/index.htm, Aug. 2000, 16 pages.
Nedap, "Data sheet fro 24 Vdc lead-acid batteries, PowerRouter Solar Battery The innovative all-in-one-unit", no date, 2 pages.
Nedap, "Installation Manual PowerRouter Solar Inverter", Jan. 9, 2013, 46 pages.
Nedap, "Installer Manual PowerRouter Solar Inverter", Jan. 9, 2013, 46 pages.
Nedap, "PowerRouter Connect, Technical data", no date, 1 page.
Nedap, "PowerRouter Solar, Technical data", no date, 1 page.
Phoenix Broadband Technologies, L.L.C., Installation & Operation Manual, 2005, 44 pages.
Rando, AC Triport—A New Uninterruptible AC Power Supply, Telephone Energy Conference, IEEE, 1978, pp. 50-58.
Rex Teets, Application and Design of Ferroresonant Transformers, No Date, pp. 28-34.
Robert J. Kakalec et al., New Technology for Battery-Charging Rectifiers, Bell Laboratories Record, May 1979, pp. 131-134.

\* cited by examiner

FULL EXTERNAL

FULL INTEGRATED

HALF EXTERNAL

HALF INTEGRATED

PUSH PULL EXTERNAL

PUSH PULL
INTEGRATED

SECONDARY TAPS

VOLTAGE REGULATED AC POWER SUPPLY SYSTEMS AND METHODS

RELATED APPLICATIONS

This application, U.S. patent application Ser. No. 16/036,725 filed Jul. 16, 2018 claims benefit of U.S. Provisional Patent Application Ser. No. 62/532,896 filed Jul. 14, 2017.

The contents of the related application listed above are incorporated herein by reference.

TECHNICAL FIELD

The present invention relates to power supply systems and methods for regulating AC voltages and, more specifically, to high efficiency power supply systems and methods with active voltage regulation.

BACKGROUND

Electrical power supply systems are used to provide power from a source of electrical power such as an electric utility, generator, solar power system or the like to a load. The electrical power supply system may be configured to perform functions such as disconnecting the load from the source of electrical power under certain conditions, regulating the power signal supplied to the load, converting direct current (DC) signals to alternating current (AC) signals, converting AC signals to DC signals, and combining power signals from different sources of electrical power. To conserve energy, electrical power supply systems should be configured to reduce losses when providing power from the source to the load.

The need exists for improved electrical power supply systems for providing power from a source to a load.

SUMMARY

The present invention may be embodied as a power supply system comprises a primary regulation system, a secondary regulation system, and a controller. The primary regulation system comprises a primary transformer and a primary tap switch array. The secondary regulation system comprising a secondary transformer and an adjustment power signal generator. The controller is configured to control the adjustment power signal generator to apply an adjustment power signal to the secondary transformer. The secondary transformer is configured to combine the adjustment power signal with a base power supply signal from the primary transformer.

The present invention may also be embodied as a power supply system for providing power to an output from an input comprising a primary regulation system, a secondary regulation system, and a controller. The primary regulation system comprising a primary transformer and a primary tap switch array. The secondary regulation system comprising a secondary transformer and an adjustment power signal generator. The primary regulation system is configured to generate a base power signal based on an input power signal at the input. The controller is configured to control the adjustment power signal generator to apply an adjustment power signal to the secondary transformer. The secondary transformer is configured to combine the adjustment power signal with the base power supply signal to apply an output power signal at the output.

The present invention may also be embodied as a method of providing power to an output from an input comprising the following steps. A primary transformer and a primary tap switch array are arranged to form a primary regulation system. A secondary transformer and an adjustment power signal generator are arranged to form a secondary regulation system. The primary tap switch array is controlled such that the primary regulation system generates a base power signal based on an input power signal at the input. The adjustment power signal generator is controlled to generate an adjustment power signal. The adjustment power signal is applied to the secondary transformer such that the adjustment power signal is combined with the base power signal to obtain an output power signal at the output.

DETAILED DESCRIPTION

The present invention may be embodied in different forms. Several different examples of embodiments of the present invention will be discussed separately below.

I. First Example Embodiment

Figure 1:
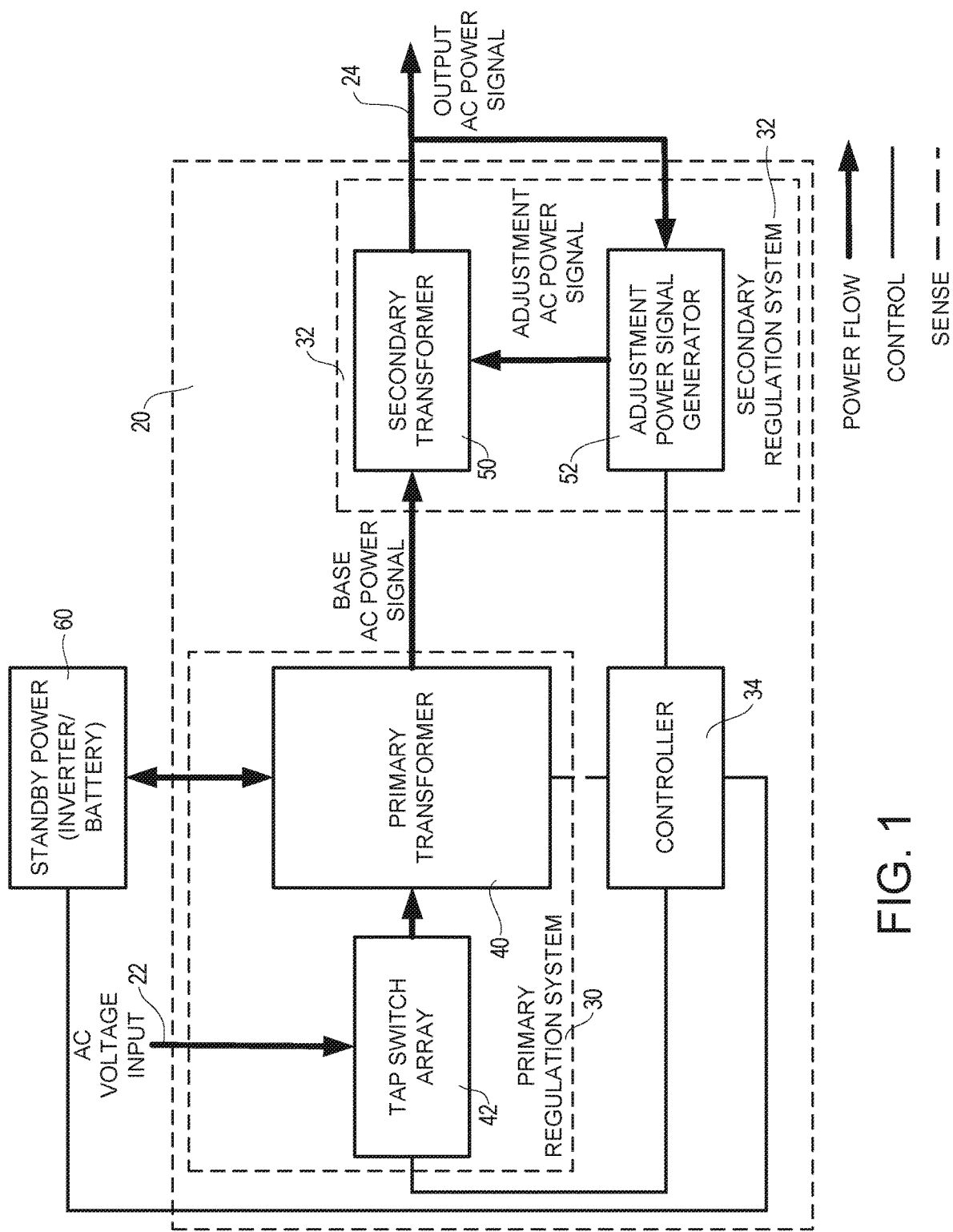
FIG. 1 is a block diagram illustrating a first example power supply system of the present invention.

Referring initially to FIG. 1 of the drawing, depicted therein is a first example power supply system 20 constructed in accordance with, and embodying, the principles of the present invention. The example power supply system 20 defines an input 22 and an output 24. The example power supply system 20 accepts an input AC power signal at the input 22 and supplies an output AC power signal at the output 24.

The first example power supply system 20 comprises a primary regulation system 30, a secondary regulation system 32, and a controller 34. The example primary regulation system 30 comprises a primary transformer 40 and a tap switch array 42. The example secondary regulation system 32 comprises a secondary transformer 50 and an adjustment power signal generator 52. The first example power supply system 20 is further configured to operate in a standby mode in which the output AC power signal is generated based on a standby power system 60. The standby power system 60 may be operatively connected to a standby power source (not shown) such as a battery, a generator, or a solar panel array and possibly an inverter (not shown).

The primary regulation system 30 is configured to regulate a voltage of the output AC power signal within a first voltage range. In particular, the controller 34 controls the tap switch array 42 based on the output AC power signal to connect the input 22 to the primary transformer 40 such that a base AC power signal output from the primary regulation system 30 is maintained within the first range. The secondary regulation system 32 is configured to regulate the voltage of the output AC power signal within a second voltage range. In particular, the controller 34 controls the adjustment power signal generator 52 based on the output AC power signal, and the secondary transformer 50 combines (e.g., sums) an adjustment AC power signal generated by the adjustment power signal generator 52 to the output of the primary transformer 40 such that the output AC power signal is maintained within the second range. The second voltage range is smaller than the first voltage range.

More specifically, the controller 34 senses voltage and/or current representative of the input AC power signal and controls the tap switch array 42 as necessary to accommodate the AC output power signal. For example, if the controller 34 determines that a sensed voltage indicates that a voltage of the AC output power signal is not within a predetermined first desired voltage range (e.g., 80-90 VAC), the controller 34 operates the tap switch array 42 such that the primary transformer 40 increases the voltage of the AC output power signal such that the AC output power signal is within the predetermined first desired voltage range.

The controller 34 further senses one or more voltages and/or currents associated with the output AC power signal and controls the adjustment power signal generator 52 to generate the adjustment power signal such that the combination of the adjustment power signal and the output of the main transformer 40 yields an output AC power signal within a predetermined second desired voltage range or level. For example, if the primary transformer 40 is configured to supply a primary transformer output voltage of approximately 85 VAC (example predetermined desired voltage level) and the actual primary transformer output voltage droops to 84 VAC, the controller 34 will control the adjustment power signal generator 52 to generate the adjustment power signal such that the adjustment power signal, in combination with the primary transformer output voltage, yields an actual output AC voltage signal that is at or near 85 VAC.

Typically, the controller 34 will include a digital microprocessor, analog-to-digital converters, memory, and associated circuitry. The microprocessor runs software capable of generating control signals (e.g., pulse-width modulate signals) for controlling the operation of the adjustment power signal generator 52 based on sense signals associated with at least a voltage of the output AC power signal. The details of the controller 34, the sense signals, the control signals, and the software running on the controller 34 are or may be conventional and will not be described herein in further detail.

II. Second Example Embodiment

Figure 2:
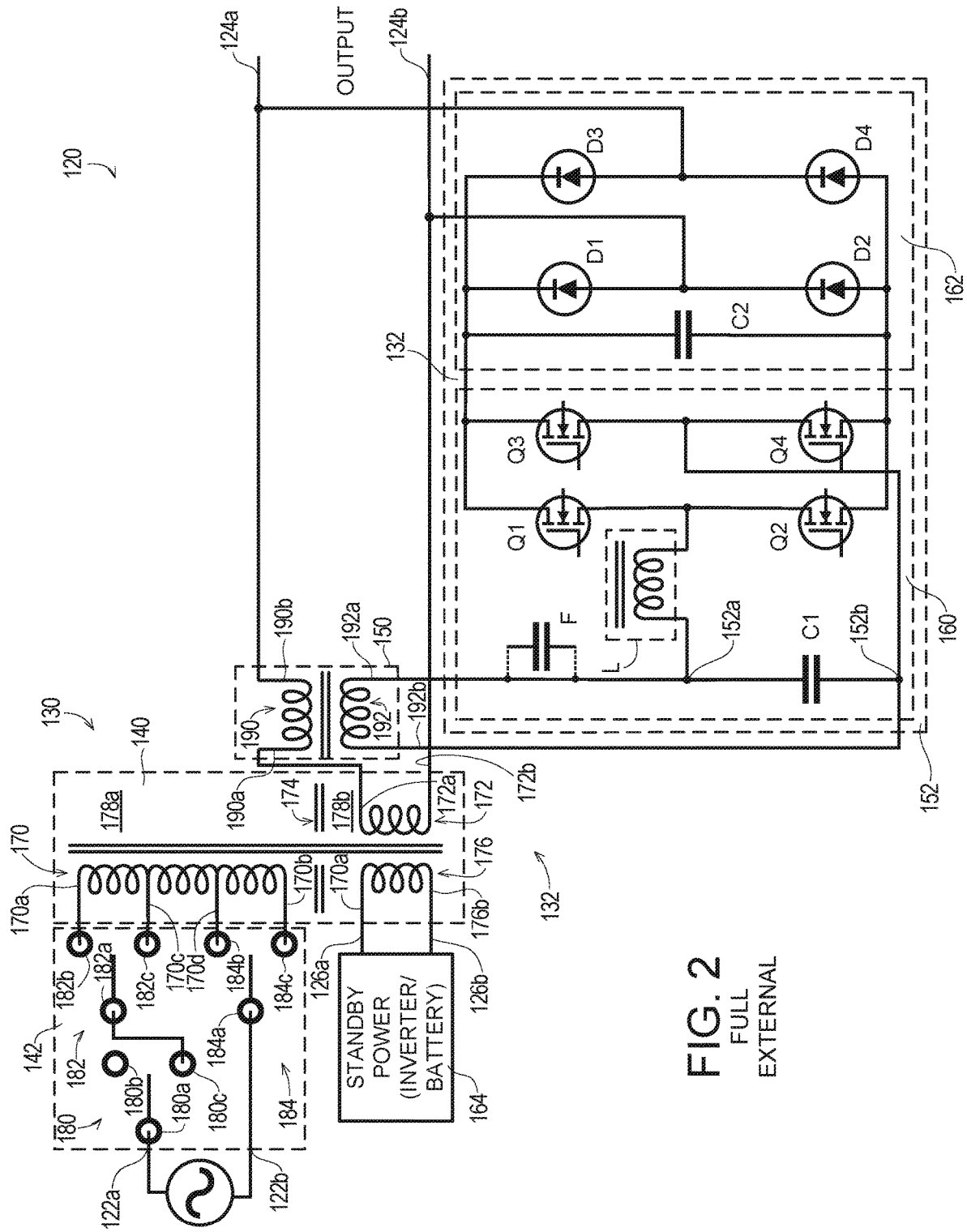
FIG. 2 is a schematic diagram illustrating a second example power supply system of the present invention.

FIG. 2 of the drawing illustrates a second example power supply system 120 comprising a primary regulation system 130, a secondary regulation system 132, and a controller (not shown). The controller of the third example power supply system 120 is or may be the same as the controller 34 described above and will not be described herein in further detail.

FIG. 2 illustrates that the second example power supply system 120 defines input terminals 122a and 122b and output terminals 124a and 124b. The example power supply system 120 accepts an input AC power signal across the input terminals 122a and 122b and supplies an output AC power signal across the output terminals 124a and 124b. The second example power supply system 120 further comprises optional standby input terminals 126a and 126b.

The example primary regulation system 130 comprises a primary transformer 140 and a tap switch array 142. The example primary transformer 140 is a linear transformer. The example secondary regulation system 132 comprises a secondary transformer 150 and a regulating inverter 152. The secondary transformer 150 is a linear transformer arranged in series with the main transformer 140. The regulating inverter 152 generates an adjustment power signal, and the secondary transformer 150 combines the adjustment power signal with the output of the primary transformer 140 to obtain the output AC power signal. The example regulating inverter 152 comprises a DC/AC converter 160 and an AC/DC converter 162.

The second example power supply system 120 may be embodied as or form a part of an uninterruptible power supply. When configured as an uninterruptible power supply, the second example power supply system 120 further optionally comprises a standby power system 164 that is operatively connected to the primary transformer 140. The standby power system 164 may comprise one or more of a battery and inverter, a generator, a solar power system, and the like. Should the input AC power signal be absent or outside of a predetermined operating range, the input terminals 122a and 122b may be disconnected from the primary transformer 140, and the output power AC signal may be generated based on a standby AC power signal generated by the standby power supply system 164.

The second example power supply system 120 thus regulates the voltage of the input AC power signal such that the output AC power signal is within predefined parameters. The second example power supply system 120 may be configured to use high efficiency linear transformers as the primary transformer 140 and the secondary transformer 150. The second example power supply system 120 thus can be configured to provide a regulated output AC regional power signal at efficiencies of approximately 95-98 percent.

In particular, the primary regulation system 130 is configured to regulate a voltage of the output AC power signal within a first voltage range. The secondary regulation system 132 is configured to regulate the voltage of the output AC power signal within a second voltage range. The second voltage range is smaller than the first voltage range. If the second example power supply system 120 is configured to provide power in the context of a broadband communications system, the output AC voltage power signal should not exceed 90 volts. The primary regulation system 130 thus allows the second example power supply 120 to adapt at a slow rate (e.g., twice a day) to relatively large voltage fluctuations (e.g., ±5 volts). The secondary regulation system 132, on the other hand, allows the second example power supply system 120 to regulate the output AC voltage, within certain parameters, to accommodate small voltage fluctuations (e.g., ±2 volts) of the input AC power signal at high frequency or substantially in real time. In the second example power supply system 120, the example first voltage range is approximately ±5 volts, and the example second voltage range is approximately ±2 volts. These ranges are provided by way of example only and may vary based on the requirements of a particular power supply environment.

The example primary transformer 140 comprises primary input windings 170, output windings 172, a shunt 174, and, optionally, secondary input windings 176. The primary input windings are arranged on a first side 178a of the shunt 174, while the output windings 172 and optional secondary input windings 176 are arranged on a second side 178b of the shunt 174. The example primary input windings 170 define primary input winding first and second end taps 170*a* and 170*b* and primary input winding first and second intermediate taps 170*c* and 170*d*. The example output windings 172 define output winding first and second end taps 172*a* and 172*b*. The example optional secondary windings 176 define secondary winding first and second end taps 172*a* and 172*b*. If used, the first and second end taps 172*a* and 172*b* are connected to the standby input terminals 126*a* and 126*b*.

The example tap switch array 142 comprises a first switch 180, a second switch 182, and a third switch 184. The example switches 180, 182, and 184 are single-pull double-through (SPDT) switches that can be controlled by the controller, operated manually, or both controlled by the controller and operated manually. The first switch 180 defines a first switch main terminal 180*a*, a first switch first contact terminal 180*b*, and a first switch second contact terminal 180*c*. The second switch 182 defines a second switch main terminal 182*a*, a second switch first contact terminal 182*b*, and a second switch second contact terminal 182*c*. The third switch 184 defines a third switch main terminal 184*a*, a third switch first contact terminal 184*b*, and a third switch second contact terminal 184*c*. The example secondary transformer 150 comprises first windings 190 and second windings 192. The example first windings 190 define first winding first and second end taps 190*a* and 190*b*. The example second windings 192 define second winding first and second end taps 192*a* and 192*b*.

The example DC/AC converter 160 comprises MOSFETs Q1, Q2, Q3, and Q4, an inductor L, and an output capacitor C1. The example AC/DC converter 162 comprises diodes D1, D2, D3, and D4 configured as a rectifier and rectifier capacitor C2. The DC/AC converter 160 defines first and second inverter terminals 152*a* and 152*b*. The example DC/AC converter 160 and the example AC/DC converter 162 operate as a full-bridge rectifier/converter that is or may be conventional and thus will not be described herein in detail. An optional filter capacitor F may be arranged to filter the output of the converter 160; in FIG. 2, the filter capacitor F is connected between the first end terminal 192*a* of the second winding 192 of the secondary transformer 150 and the first inverter output terminal 152*a*.

The first switch main terminal 180*a* is connected to the first primary input terminal 122*a*. The first switch first contact terminal 180*b* is not connected to any other terminal, allowing the first switch to disconnect the power system from the input. The first switch second contact terminal 180*c* is connected to the second switch main terminal 182*a*. The second switch first contact terminal 182*b* is connected to the primary winding first end tap 170*a*. The second switch second contact terminal 182*c* is connected to the primary winding first intermediate tap 170*c*. The third switch main terminal 184*a* is connected to the second primary input terminal 122*b*. The third switch first contact terminal 184*b* is connected to the primary winding second intermediate tap 170*d*. The third switch second contact terminal 184*c* is connected to the primary winding second end tap 170*b*. The output winding first end tap 172*a* is connected to the first winding first end tap 190*a*. The output winding second end tap 172*b* is connected to the second output terminal 124*b*. The first winding second end tap 190*b* is connected to the first output terminal 124*a*. The second winding first end tap 192*a* is connected to one end of the inverter capacitor C1. The second winding first and second end terminals 192*a* and 192*b* are connected to the first and second inverter output terminals 152*a* and 152*b*.

The AC/DC converter 162 formed by the rectifier diodes D1-D4 and rectifier capacitor C2 is connected across the output terminals 124*a* and 124*b* such that a DC signal is present at the DC/AC converter 160. The switches formed by the MOSFETS Q1-Q4 are controlled (e.g., pulse-width modulated) based on the voltage of the output AC power signal or a voltage indicative of or proportional to the output AC power signal to generate the regulated power signal across the inverter output terminals 152*a* and 152*b*. The regulated power signal is applied across the second windings 192 of the secondary transformer 150 and are thus added to the adjustment AC power signal across the output winding first and second end terminals 172*a* and 172*b*. The sum of the voltage of the adjustment AC power signal and base AC power signal generated by the primary regulation system 130 (e.g., across the output winding first and second end terminals 172*a* and 172*b*) is thus controlled to be within a predetermined range centered about a target output AC power signal voltage level.

When configured as an uninterruptible power supply, the standby input terminals 126*a* and 126*b* of the second example power supply system 120 may be connected to the standby power system 164 such that the standby power system 164 is operatively connected to the primary transformer 140. Should the example power system 120 not form a part of an uninterruptible power supply, the second input windings 176 and standby input terminals 126*a* and 126*b* may be omitted.

The second example power supply system 120 thus regulates the voltage of the input AC power signal such that the output AC power signal is within predefined parameters. The second example power supply system 120 may be configured to use high efficiency linear transformers as the primary transformer 140 and the secondary transformer 150. The second example power supply system 120 thus can be configured to provide a regulated output AC power signal at efficiencies of between 95-98 percent. In the second example power supply system 120, the inductor L is external to the secondary transformer 150.

III. Third Example Embodiment

Figure 3:
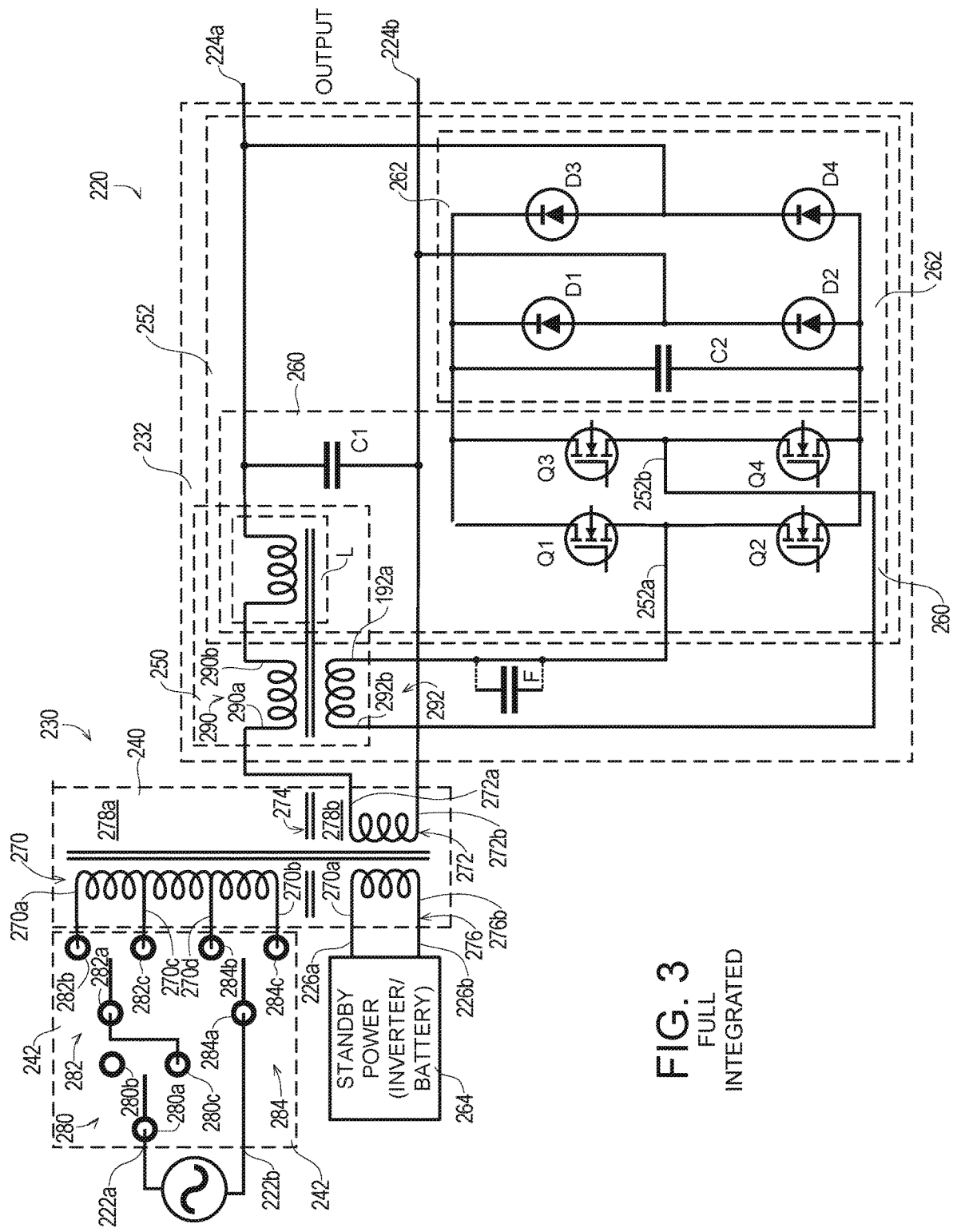
FIG. 3 is a schematic diagram illustrating a third example power supply system of the present invention.

FIG. 3 of the drawing illustrates a third example power supply system 220 comprising a primary regulation system 230, a secondary regulation system 232, and a controller (not shown). The controller of the third example power supply system 220 is or may be the same as the controller 34 described above and will not be described herein in further detail.

FIG. 3 illustrates that the third example power supply system 220 defines input terminals 222*a* and 222*b* and output terminals 224*a* and 224*b*. The example power supply system 220 accepts an input AC power signal across the input terminals 222*a* and 222*b* and supplies an output AC power signal across the output terminals 224*a* and 224*b*. The third example power supply system 220 further comprises optional standby input terminals 226*a* and 226*b*.

The third example primary regulation system 230 comprises a primary transformer 240 and a tap switch array 242. The example primary transformer 240 is a linear transformer. The example secondary regulation system 232 comprises a secondary transformer 250 and a regulating inverter 252. The secondary transformer 250 is a linear transformer arranged in series with the primary transformer 240. The regulating inverter 252 generates an adjustment power signal, and the secondary transformer 250 combines the adjustment power signal with the output of the primary transformer 240 to obtain the output AC power signal. The example regulating inverter 252 comprises a DC/AC converter 260 and an AC/DC converter 262.

The third example power supply system 220 may be embodied as or form a part of an uninterruptible power supply. When configured as an uninterruptible power supply, the third example power supply system 220 further optionally comprises a standby power system 264 that is operatively connected to the primary transformer 240. The standby power system 264 may comprise one or more of a battery and inverter, a generator, a solar power system, and the like. Should the input AC power signal be absent or outside of a predetermined operating range, the inputs 222a and 222b may be disconnected from the primary transformer 240, and the output power AC signal may be generated based on a standby AC power signal generated by the standby power supply system 264.

The third example power supply system 220 thus regulates the voltage of the input AC power signal such that the output AC power signal is within predefined parameters. The third example power supply system 220 may be configured to use high efficiency linear transformers as the primary transformer 240 and the secondary transformer 250. The third example power supply system 220 thus can be configured to provide a regulated output AC regional power signal at efficiencies of approximately 95-98 percent.

In particular, the primary regulation system 230 is configured to regulate a voltage of the output AC power signal within a first voltage range. The secondary regulation system 232 is configured to regulate the voltage of the output AC power signal within a second voltage range. The second voltage range is smaller than the first voltage range. If the third example power supply system 220 is configured to provide power in the context of a broadband communications system, the output AC voltage power signal should not exceed 90 volts. The primary regulation system 230 thus allows the third example power supply 220 to adapt at a slow rate (e.g., twice a day) to relatively large voltage fluctuations (e.g., ±5 volts). The secondary regulation system 232, on the other hand, allows the third example power supply system 220 to regulate the output AC voltage, within certain parameters, to accommodate small voltage fluctuations (e.g., ±2 volts) of the input AC power signal at high frequency or substantially in real time. In the third example power supply system 220, the example first voltage range is approximately ±5 volts, and the example second voltage range is approximately ±2 volts. These ranges are provided by way of example only and may vary based on the requirements of a particular power supply environment.

The example primary transformer 240 comprises primary input windings 270, output windings 272, a shunt 274, and, optionally, secondary input windings 276. The primary input windings are arranged on a first side 278a of the shunt 274, while the output windings 272 and optional secondary input windings 276 are arranged on a second side 278b of the shunt 274. The example primary input windings 270 define primary input winding first and second end taps 270a and 270b and primary input winding first and second intermediate taps 270c and 270d. The example output windings 272 define output winding first and second end taps 272a and 272b. The example optional secondary windings 276 define secondary winding first and second end taps 276a and 276b. If used, the first and second end taps 276a and 276b are connected to the standby input terminals 226a and 226b.

The example tap switch array 242 comprises a first switch 280, a second switch 282, and a third switch 284. The example switches 280, 282, and 284 are single-pull double-through (SPDT) switches that can be controlled by the controller, operated manually, or both controlled by the controller and operated manually. The first switch 280 defines a first switch main terminal 280a, a first switch first contact terminal 280b, and a first switch second contact terminal 280c. The second switch 282 defines a second switch main terminal 282a, a second switch first contact terminal 282b, and a second switch second contact terminal 282c. The third switch 284 defines a third switch main terminal 284a, a third switch first contact terminal 284b, and a third switch second contact terminal 284c. The example secondary transformer 250 comprises first windings 290 and second windings 292. The example first windings 290 define first winding first and second end taps 290a and 290b. The example second windings 292 define second winding first and second end taps 292a and 292b.

The example DC/AC converter 260 comprises MOSFETs Q1, Q2, Q3, and Q4, an inductor L, and an output capacitor C1. In the third example power supply 220, the inductor L is integrally formed with the secondary transformer 250. The example AC/DC converter 262 comprises diodes D1, D2, D3, and D4 configured as a rectifier and rectifier capacitor C2. The DC/AC converter 260 defines first and second inverter terminals 252a and 252b. The example DC/AC converter 260 and the example AC/DC converter 262 operate as a full-bridge rectifier/converter that is or may be conventional and thus will not be described herein in detail. An optional filter capacitor F may be arranged to filter the output of the converter 260; in FIG. 3, the filter capacitor F is connected between the first end terminal 292a of the second winding 292 of the secondary transformer 250 and the first inverter output terminal 252a.

The first switch main terminal 280a is connected to the first primary input terminal 222a. The first switch first contact terminal 280b is not connected to any other terminal, allowing the first switch to disconnect the power system from the input. The first switch second contact terminal 280c is connected to the second switch main terminal 282a. The second switch first contact terminal 282b is connected to the primary winding first end tap 270a. The second switch second contact terminal 282c is connected to the primary winding first intermediate tap 270c. The third switch main terminal 284a is connected to the second primary input terminal 222b. The third switch first contact terminal 284b is connected to the primary winding second intermediate tap 270d. The third switch second contact terminal 284c is connected to the primary winding second end tap 270b. The output winding first end tap 272a is connected to the first winding first end tap 290a. The output winding second end tap 272b is connected to the second output terminal 224b. The first winding second end tap 290b is connected, through the inductor L, to one side of the inverter capacitor C1 and to the first output terminal 224a. The second winding first end tap 292a is connected to inverter outputs 252a and 252b. The second winding first and second end terminals 292a and 292b are connected to the first and second inverter output terminals 252a and 252b.

The AC/DC converter 262 formed by the rectifier diodes D1-D4 and rectifier capacitor C2 is connected across the output terminals 224a and 224b such that a DC signal is present at the DC/AC converter 260. The switches formed by the MOSFETS Q1-Q4 are controlled (e.g., pulse-width modulated) based on the voltage of the output AC power signal or a voltage indicative of or proportional to the output AC power signal to generate the regulated power signal across the inverter output terminals 252a and 252b. The regulated power signal is applied across the second windings 292 of the secondary transformer 250 and are thus added to the adjustment AC power signal across the output winding first and second end terminals 272a and 272b. The sum of the voltage of the adjustment AC power signal and base AC power signal generated by the primary regulation system 230 (e.g., across the output winding first and second end terminals 272a and 272b) is thus controlled to be within a predetermined range centered about a target output AC power signal voltage level.

When configured as an uninterruptible power supply, the standby input terminals 226a and 226b of the third example power supply system 220 may be connected to the standby power system 264 such that the standby power system 264 is operatively connected to the primary transformer 240. Should the example power system 220 not form a part of an uninterruptible power supply, the second input windings 276 and standby input terminals 226a and 226b may be omitted.

The third example power supply system 220 thus regulates the voltage of the input AC power signal such that the output AC power signal is within predefined parameters. The third example power supply system 220 may be configured to use high efficiency linear transformers as the primary transformer 240 and the secondary transformer 250. The third example power supply system 220 thus can be configured to provide a regulated output AC power signal at efficiencies of between 95-98 percent. In the third example power supply system 220, the inductor L is integrated into the secondary transformer 250.

IV. Fourth Example Embodiment

Figure 4:
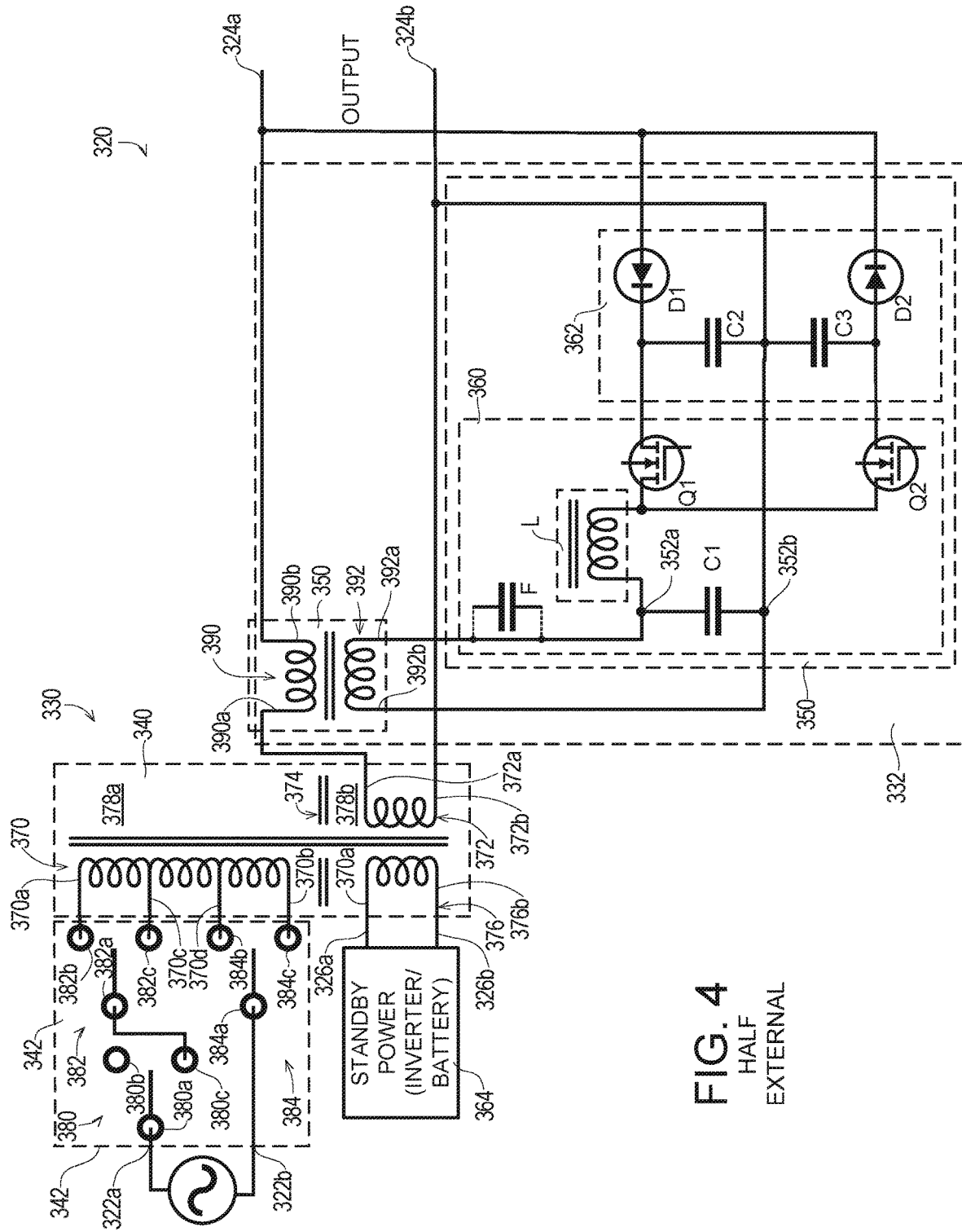
FIG. 4 is a schematic diagram illustrating a fourth example power supply system of the present invention.

FIG. 4 of the drawing illustrates a fourth example power supply system 320 comprising a primary regulation system 330, a secondary regulation system 332, and a controller (not shown). The controller of the fourth example power supply system 320 may be implemented in a manner similar to that of the controller 34 described above and will not be described herein in further detail.

FIG. 4 illustrates that the fourth example power supply system 320 defines input terminals 322a and 322b and output terminals 324a and 324b. The example power supply system 320 accepts an input AC power signal across the input terminals 322a and 322b and supplies an output AC power signal across the output terminals 324a and 324b. The fourth example power supply system 320 further comprises optional standby input terminals 326a and 326b.

The example primary regulation system 330 comprises a primary transformer 340 and a tap switch array 342. The example primary transformer 340 is a linear transformer. The example secondary regulation system 332 comprises a secondary transformer 350 and a regulating inverter 352. The secondary transformer 350 is a linear transformer arranged in series with the primary transformer 340. The regulating inverter 352 generates an adjustment power signal, and the secondary transformer 350 combines the adjustment power signal with the output of the primary transformer 340 to obtain the output AC power signal. The example regulating inverter 352 comprises a DC/AC converter 360 and an AC/DC converter 362.

The fourth example power supply system 320 may be embodied as or form a part of an uninterruptible power supply. When configured as an uninterruptible power supply, the fourth example power supply system 320 further optionally comprises a standby power system 364 that is operatively connected to the primary transformer 340. The standby power system 364 may comprise one or more of a battery and inverter, a generator, a solar power system, and the like. Should the input AC power signal be absent or outside of a predetermined operating range, the input terminals 322a and 322b may be disconnected from the primary transformer 340, and the output power AC signal may be generated based on a standby AC power signal generated by the standby power supply system 364.

The fourth example power supply system 320 thus regulates the voltage of the input AC power signal such that the output AC power signal is within predefined parameters. The fourth example power supply system 320 may be configured to use high efficiency linear transformers as the primary transformer 340 and the secondary transformer 350. The fourth example power supply system 320 thus can be configured to provide a regulated output AC regional power signal at efficiencies of approximately 95-98 percent.

In particular, the primary regulation system 330 is configured to regulate a voltage of the output AC power signal within a first voltage range. The secondary regulation system 332 is configured to regulate the voltage of the output AC power signal within a second voltage range. The second voltage range is smaller than the first voltage range. If the fourth example power supply system 320 is configured to provide power in the context of a broadband communications system, the output AC voltage power signal should not exceed 90 volts. The primary regulation system 330 thus allows the fourth example power supply 320 adapt at a slow rate (e.g., twice a day) to relatively large voltage fluctuations (e.g., ±5 volts). The secondary regulation system 332, on the other hand, allows the fourth example power supply system 320 to regulate the output AC voltage, within certain parameters, to accommodate small voltage fluctuations (e.g., ±2 volts) of the input AC power signal at high frequency or substantially in real time. In the fourth example power supply system 320, the example first voltage range is approximately ±5 volts, and the example second voltage range is approximately ±3 volts. These ranges are provided by way of example only and may vary based on the requirements of a particular power supply environment.

The example primary transformer 340 comprises primary input windings 370, output windings 372, a shunt 374, and, optionally, secondary input windings 376. The primary input windings 370 are arranged on a first side 378a of the shunt 374, while the output windings 372 and optional secondary input windings 376 are arranged on a second side 378b of the shunt 374. The example primary input windings 370 define primary input winding first and second end taps 370a and 370b and primary input winding first and second intermediate taps 370c and 370d. The example output windings 372 define output winding first and second end taps 372a and 372b. The example optional secondary windings 376 define secondary winding first and second end taps 376a and 376b. If used, the first and second end taps 376a and 376b are connected to the standby input terminals 326a and 326b.

The example tap switch array 342 comprises a first switch 380, a second switch 382, and a third switch 384. The example switches 380, 382, and 384 are single-pull double-through (SPDT) switches that can be controlled by the controller, operated manually, or both controlled by the controller and operated manually. The first switch 380 defines a first switch main terminal 380a, a first switch first contact terminal 380b, and a first switch second contact terminal 380c. The second switch 382 defines a second switch main terminal 382a, a second switch first contact terminal 382b, and a second switch second contact terminal 382c. The third switch 384 defines a third switch main terminal 384a, a third switch first contact terminal 384b, and a third switch second contact terminal 384c. The example secondary transformer 350 comprises first windings 390 and second windings 392. The example first windings 390 define first winding first and second end taps 390a and 390b. The example second windings 392 define second winding first and second end taps 392a and 392b.

The example DC/AC converter 360 comprises MOSFETs Q1 and Q2, an inductor L, and an output capacitor C1. In the fourth example power supply 320, the inductor L is external to the secondary transformer 350. The example AC/DC converter 362 comprises diodes D1 and D2 and a rectifier capacitors C2 and C3 configured as a rectifier. The DC/AC converter 360 defines first and second inverter terminals 352a and 352b. The example DC/AC converter 360 and the example AC/DC converter 362 operate as a half-bridge rectifier/converter that is or may be conventional and thus will not be described herein in detail. An optional filter capacitor F may be arranged to filter the output of the converter 360; in FIG. 4, the filter capacitor F is connected between the first end terminal 392a of the second winding 392 of the secondary transformer 350 and the first inverter output terminal 352a.

The first switch main terminal 380a is connected to the first primary input terminal 322a. The first switch first contact terminal 380b is not connected to any other terminal, allowing the first switch to disconnect the power system from the input. The first switch second contact terminal 380c is connected to the second switch main terminal 382a. The second switch first contact terminal 382b is connected to the primary winding first end tap 370a. The second switch second contact terminal 382c is connected to the primary winding first intermediate tap 370c. The third switch main terminal 384a is connected to the second primary input terminal 322b. The third switch first contact terminal 384b is connected to the primary winding second intermediate tap 370d. The third switch second contact terminal 384c is connected to the primary winding second end tap 370b. The output winding first end tap 372a is connected to the first winding first end tap 390a. The output winding second end tap 372b is connected to the second output terminal 324b. The first winding second end tap 390b is connected to the first output terminal 324a. The second winding first and second end terminals 392a and 392b are connected to the first and second inverter output terminals 352a and 352b.

The AC/DC converter 362 formed by the rectifier diodes D1 and D2 and rectifier capacitors C2 and C3 connected across the output terminals 324a and 324b such that a DC signal is present at the DC/AC converter 360. The switches formed by the MOSFETS Q1 and Q2 are controlled (e.g., pulse-width modulated) based on the voltage of the output AC power signal or a voltage indicative of or proportional to the output AC power signal to generate the regulated power signal across the inverter output terminals 352a and 352b. The regulated power signal is applied across the second windings 392 of the secondary transformer 350 and are thus added to the adjustment AC power signal across the output winding first and second end terminals 372a and 372b. The sum of the voltage of the adjustment AC power signal and base AC power signal generated by the primary regulation system 330 (e.g., across the output winding first and second end terminals 372a and 372b) is thus controlled to be within a predetermined range centered about a target output AC power signal voltage level.

When configured as an uninterruptible power supply, the standby input terminals 326a and 326b of the fourth example power supply system 320 may be connected to the standby power system 364 such that the standby power system 364 is operatively connected to the primary transformer 340. Should the example power system 320 not form a part of an uninterruptible power supply, the second input windings 376 and standby input terminals 326a and 326b may be omitted.

The fourth example power supply system 320 thus regulates the voltage of the input AC power signal such that the output AC power signal is within predefined parameters. The fourth example power supply system 320 may be configured to use high efficiency linear transformers as the primary transformer 340 and the secondary transformer 350. The fourth example power supply system 320 thus can be configured to provide a regulated output AC power signal at efficiencies of between 95-98 percent. In the fourth example power supply system 320, the inductor L is external to the secondary transformer 350.

V. Fifth Example Embodiment

Figure 5:
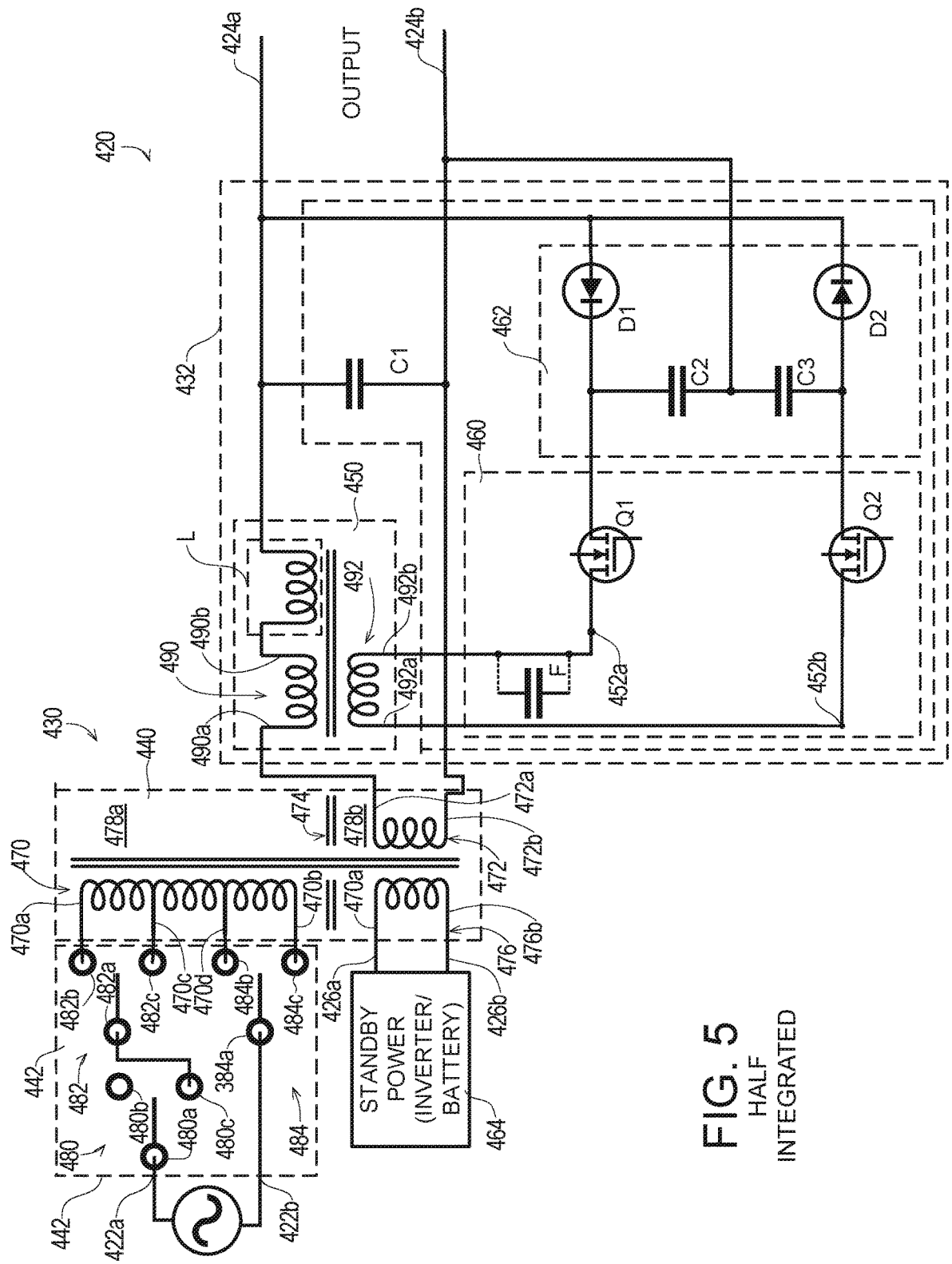
FIG. 5 is a schematic diagram illustrating a fifth example power supply system of the present invention.

FIG. 5 of the drawing illustrates a fifth example power supply system 420 comprising a primary regulation system 430, a secondary regulation system 432, and a controller (not shown). The controller of the fifth example power supply system 420 may be implemented in a manner similar to that of the controller 34 described above and will not be described herein in further detail.

FIG. 5 illustrates that the fifth example power supply system 420 defines input terminals 422a and 422b and output terminals 424a and 424b. The example power supply system 420 accepts an input AC power signal across the input terminals 422a and 422b and supplies an output AC power signal across the output terminals 424a and 424b. The fifth example power supply system 420 further comprises optional standby input terminals 426a and 426b.

The example primary regulation system 430 comprises a primary transformer 440 and a tap switch array 442. The example primary transformer 440 is a linear transformer. The example secondary regulation system 432 comprises a secondary transformer 450 and a regulating inverter 452. The secondary transformer 450 is a linear transformer arranged in series with the primary transformer 440. The regulating inverter 452 generates an adjustment power signal, and the secondary transformer 450 combines the adjustment power signal with the output of the primary transformer 440 to obtain the output AC power signal. The example regulating inverter 452 comprises a DC/AC converter 460 and an AC/DC converter 462.

The fifth example power supply system 420 may be embodied as or form a part of an uninterruptible power supply. When configured as an uninterruptible power supply, the fifth example power supply system 420 further optionally comprises a standby power system 464 that is operatively connected to the primary transformer 440. The standby power system 464 may comprise one or more of a battery and inverter, a generator, a solar power system, and the like. Should the input AC power signal be absent or outside of a predetermined operating range, the input terminals 422a and 422b may be disconnected from the primary transformer 440, and the output power AC signal may be generated based on a standby AC power signal generated by the standby power supply system 464.

The fifth example power supply system 420 thus regulates the voltage of the input AC power signal such that the output AC power signal is within predefined parameters. The fifth example power supply system 420 may be configured to use high efficiency linear transformers as the primary transformer 440 and the secondary transformer 450. The fifth example power supply system 420 thus can be configured to provide a regulated output AC regional power signal at efficiencies of approximately 95-98 percent.

In particular, the primary regulation system 430 is configured to regulate a voltage of the output AC power signal within a first voltage range. The secondary regulation system 432 is configured to regulate the voltage of the output AC power signal within a second voltage range. The second voltage range is smaller than the first voltage range. If the fifth example power supply system 420 is configured to provide power in the context of a broadband communications system, the output AC voltage power signal should not exceed 90 volts. The primary regulation system 430 thus allows the fifth example power supply 420 adapt at a slow rate (e.g., twice a day) to relatively large voltage fluctuations (e.g., ±5 volts). The secondary regulation system 432, on the other hand, allows the fifth example power supply system 420 to regulate the output AC voltage, within certain parameters, to accommodate small voltage fluctuations (e.g., ±2 volts) of the input AC power signal at high frequency or substantially in real time. In the fifth example power supply system 420, the example first voltage range is approximately ±5 volts, and the example second voltage range is approximately ±2 volts. These ranges are provided by way of example only and may vary based on the requirements of a particular power supply environment.

The example primary transformer 440 comprises primary input windings 470, output windings 472, a shunt 474, and, optionally, secondary input windings 476. The primary input windings are arranged on a first side 478a of the shunt 474, while the output windings 472 and optional secondary input windings 476 are arranged on a second side 478b of the shunt 474. The example primary input windings 470 define primary input winding first and second end taps 470a and 470b and primary input winding first and second intermediate taps 470c and 470d. The example output windings 472 define output winding first and second end taps 472a and 472b. The example optional secondary windings 476 define secondary winding first and second end taps 476a and 476b. If used, the first and second end taps 476a and 476b are connected to the standby input terminals 426a and 426b.

The example tap switch array 442 comprises a first switch 480, a second switch 482, and a third switch 484. The example switches 480, 482, and 484 are single-pull double-through (SPDT) switches that can be controlled by the controller, operated manually, or both controlled by the controller and operated manually. The first switch 480 defines a first switch main terminal 480a, a first switch first contact terminal 480b, and a first switch second contact terminal 480c. The second switch 482 defines a second switch main terminal 482a, a second switch first contact terminal 482b, and a second switch second contact terminal 482c. The third switch 484 defines a third switch main terminal 484a, a third switch first contact terminal 484b, and a third switch second contact terminal 484c. The example secondary transformer 450 comprises first windings 490 and second windings 492. The example first windings 490 define first winding first and second end taps 490a and 490b. The example second windings 492 define second winding first and second end taps 492a and 492b.

The example DC/AC converter 460 comprises MOSFETs Q1 and Q2, an inductor L, and an output capacitor C1. In the fifth example power supply 420, the inductor L is internal to the secondary transformer 450. The example AC/DC converter 462 comprises diodes D1 and D2 and rectifier capacitors C2 and C3 configured as a rectifier. The DC/AC converter 460 defines first and second inverter terminals 452a and 452b. The example DC/AC converter 460 and the example AC/DC converter 462 operate as a half-bridge rectifier/converter that is or may be conventional and thus will not be described herein in detail. An optional filter capacitor F may be arranged to filter the output of the converter 460; in FIG. 5, the filter capacitor F is connected between the first end terminal 492a of the second winding 492 of the secondary transformer 450 and the first inverter output terminal 452a.

The first switch main terminal 480a is connected to the first primary input terminal 422a. The first switch first contact terminal 480b is not connected to any other terminal, allowing the first switch to disconnect the power system from the input. The first switch second contact terminal 480c is connected to the second switch main terminal 482a. The second switch first contact terminal 482b is connected to the primary winding first end tap 470a. The second switch second contact terminal 482c is connected to the primary winding first intermediate tap 470c. The third switch main terminal 484a is connected to the second primary input terminal 422b. The third switch first contact terminal 484b is connected to the primary winding second intermediate tap 470d. The third switch second contact terminal 484c is connected to the primary winding second end tap 470b. The output winding first end tap 472a is connected to the first winding first end tap 490a. The output winding second end tap 472b is connected to the second output terminal 424b. The first winding second end tap 490b is connected to the first output terminal 424a through the inductor L.

The AC/DC converter 462 formed by the rectifier diodes D1 and D2 and rectifier capacitors C2 and C3 are connected across the output terminals 424a and 424b such that a DC signal is present at the DC/AC converter 460. The switches formed by the MOSFETS Q1 and Q2 are controlled (e.g., pulse-width modulated) based on the voltage of the output AC power signal or a voltage indicative of or proportional to the output AC power signal to generate the regulated power signal across the inverter output terminals 452a and 452b. The regulated power signal is applied across the second windings 492 of the secondary transformer 450 and are thus added to the adjustment AC power signal across the output winding first and second end terminals 472a and 472b. The sum of the voltage of the adjustment AC power signal and base AC power signal generated by the primary regulation system 430 (e.g., across the output winding first and second end terminals 472a and 472b) is thus controlled to be within a predetermined range centered about a target output AC power signal voltage level.

When configured as an uninterruptible power supply, the standby input terminals 426a and 426b of the fifth example power supply system 420 may be connected to the standby power system 464 such that the standby power system 464 is operatively connected to the primary transformer 440. Should the example power system 420 not form a part of an uninterruptible power supply, the second input windings 476 and standby input terminals 426a and 426b may be omitted.

The fifth example power supply system 420 thus regulates the voltage of the input AC power signal such that the output AC power signal is within predefined parameters. The fifth example power supply system 420 may be configured to use high efficiency linear transformers as the primary transformer 440 and the secondary transformer 450. The fifth example power supply system 420 thus can be configured to provide a regulated output AC power signal at efficiencies of between 95-98 percent. In the fifth example power supply system 420, the inductor L is integrated into the secondary transformer 450.

VI. Sixth Example Embodiment

Figure 6:
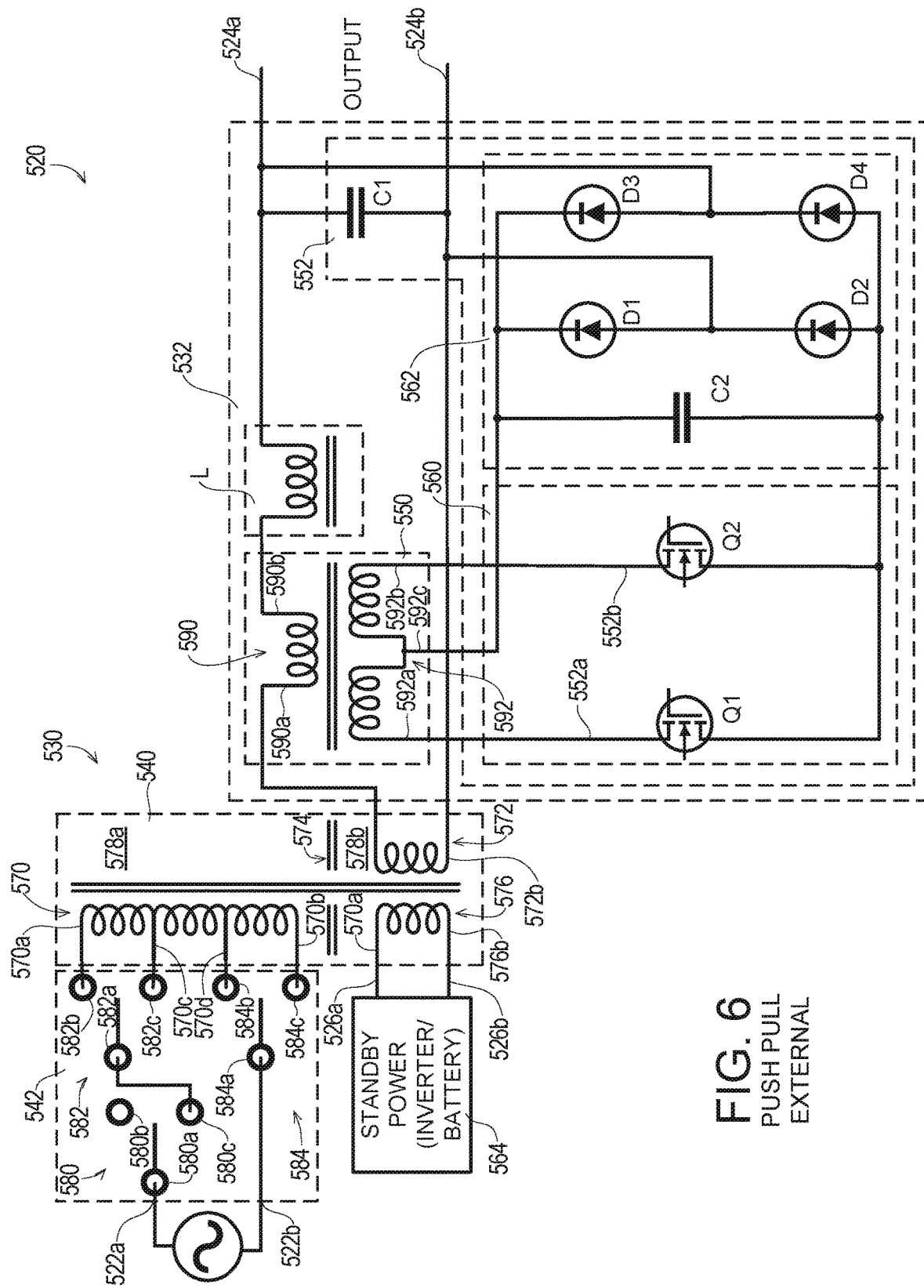
FIG. 6 is a schematic diagram illustrating a sixth example power supply system of the present invention.

FIG. 6 of the drawing illustrates a sixth example power supply system 520 comprising a primary regulation system 530, a secondary regulation system 532, and a controller (not shown). The controller of the sixth example power supply system 520 may be implemented in a manner similar to that of the controller 34 described above and will not be described herein in further detail.

FIG. 6 illustrates that the sixth example power supply system 520 defines input terminals 522a and 522b and output terminals 524a and 524b. The example power supply system 520 accepts an input AC power signal across the input terminals 522a and 522b and supplies an output AC power signal across the output terminals 524a and 524b. The sixth example power supply system 520 further comprises optional standby input terminals 526a and 526b.

The example primary regulation system 530 comprises a primary transformer 540 and a tap switch array 542. The example primary transformer 540 is a linear transformer. The example secondary regulation system 532 comprises a secondary transformer 550 and a regulating inverter 552. The secondary transformer 550 is a linear transformer arranged in series with the primary transformer 540. The regulating inverter 552 generates an adjustment power signal, and the secondary transformer 550 combines the adjustment power signal with the output of the primary transformer 540 to obtain the output AC power signal. The example regulating inverter 552 comprises a DC/AC converter 560 and an AC/DC converter 562.

The sixth example power supply system 520 may be embodied as or form a part of an uninterruptible power supply. When configured as an uninterruptible power supply, the sixth example power supply system 520 further optionally comprises a standby power system 564 that is operatively connected to the primary transformer 540. The standby power system 564 may comprise one or more of a battery and inverter, a generator, a solar power system, and the like. Should the input AC power signal be absent or outside of a predetermined operating range, the input 522a and 522b may be disconnected from the primary transformer 540, and the output power AC signal may be generated based on a standby AC power signal generated by the standby power supply system 564.

The sixth example power supply system 520 thus regulates the voltage of the input AC power signal such that the output AC power signal is within predefined parameters. The sixth example power supply system 520 may be configured to use high efficiency linear transformers as the primary transformer 540 and the secondary transformer 550. The sixth example power supply system 520 thus can be configured to provide a regulated output AC regional power signal at efficiencies of approximately 95-98 percent.

In particular, the primary regulation system 530 is configured to regulate a voltage of the output AC power signal within a first voltage range. The secondary regulation system 532 is configured to regulate the voltage of the output AC power signal within a second voltage range. The second voltage range is smaller than the first voltage range. If the sixth example power supply system 520 is configured to provide power in the context of a broadband communications system, the output AC voltage power signal should not exceed 90 volts. The primary regulation system 530 thus allows the sixth example power supply 520 adapt at a slow rate (e.g., twice a day) to relatively large voltage fluctuations (e.g., ±5 volts). The secondary regulation system 532, on the other hand, allows the sixth example power supply system 520 to regulate the output AC voltage, within certain parameters, to accommodate small voltage fluctuations (e.g., ±2 volts) of the input AC power signal at high frequency or substantially in real time. In the sixth example power supply system 520, the example first voltage range is approximately ±5 volts, and the example second voltage range is approximately ±2 volts. These ranges are provided by way of example only and may vary based on the requirements of a particular power supply environment.

The example primary transformer 540 comprises primary input windings 570, output windings 572, a shunt 574, and, optionally, secondary input windings 576. The primary input windings are arranged on a first side 578a of the shunt 574, while the output windings 572 and optional secondary input windings 576 are arranged on a second side 578b of the shunt 574. The example primary input windings 570 define primary input winding first and second end taps 570a and 570b and primary input winding first and second intermediate taps 570c and 570d. The example output windings 572 define output winding first and second end taps 572a and 572b. The example optional secondary windings 576 define secondary winding first and second end taps 576a and 576b. If used, the first and second end taps 576a and 576b are connected to the standby input terminals 526a and 526b.

The example tap switch array 542 comprises a first switch 580, a second switch 582, and a third switch 584. The example switches 580, 582, and 584 are single-pull double-through (SPDT) switches that can be controlled by the controller, operated manually, or both controlled by the controller and operated manually. The first switch 580 defines a first switch main terminal 580a, a first switch first contact terminal 580b, and a first switch second contact terminal 580c. The second switch 582 defines a second switch main terminal 582a, a second switch first contact terminal 582b, and a second switch second contact terminal 582c. The third switch 584 defines a third switch main terminal 584a, a third switch first contact terminal 584b, and a third switch second contact terminal 584c. The example secondary transformer 550 comprises first windings 590 and second windings 592. The example first windings 590 define first winding first and second end taps 590a and 590b. The example second windings 592 define second winding first and second end taps 592a and 592b and an intermediate tap 592c.

The example DC/AC converter 560 comprises MOSFETs Q1 and Q2, an inductor L, and an output capacitor C1. In the sixth example power supply 520, the inductor L is external to the secondary transformer 550. The example AC/DC converter 562 comprises diodes D1-D4 configured as a rectifier and a rectifier capacitor C2. The DC/AC converter 560 defines first and second inverter terminals 552a and 552b. The example DC/AC converter 560 and the example AC/DC converter 562 operate as a full-bridge rectifier/push-pull converter (switch mode power supply) that is or may be conventional and thus will not be described herein in detail. An optional filter capacitor (not shown) may be arranged to filter the output of the converter 560.

The first switch main terminal 580a is connected to the first primary input terminal 522a. The first switch first contact terminal 580b is not connected to any other terminal, allowing the first switch to disconnect the power system from the input. The first switch second contact terminal 580c is connected to the second switch main terminal 582a. The second switch first contact terminal 582b is connected to the primary winding first end tap 570a. The second switch second contact terminal 582c is connected to the primary winding first intermediate tap 570c. The third switch main terminal 584a is connected to the second primary input terminal 522b. The third switch first contact terminal 584b is connected to the primary winding second intermediate tap 570d. The third switch second contact terminal 584c is connected to the primary winding second end tap 570b. The output winding first end tap 572a is connected to the first winding first end tap 590a. The output winding second end tap 572b is connected to the second output terminal 524b. The first winding second end tap 590b is connected to the first output terminal 524a. The second winding first end tap 592a is connected to one end of the inverter capacitor C1. The second winding first and second end terminals 592a and 592b are connected to the first and second inverter output terminals 552a and 552b.

The AC/DC converter 562 formed by the rectifier diodes D1-D4 and rectifier capacitor C2 is connected across the output terminals 524a and 524b such that a DC signal is present at the DC/AC converter 560. The switches formed by the MOSFETS Q1 and Q2 are controlled (e.g., pulse-width modulated) based on the voltage of the output AC power signal or a voltage indicative of or proportional to the output AC power signal to generate the regulated power signal across the inverter output terminals 552a and 552b. The regulated power signal is applied across the second windings 592 of the secondary transformer 550 and are thus added to the adjustment AC power signal across the output winding first and second end terminals 572a and 572b. The sum of the voltage of the adjustment AC power signal and base AC power signal generated by the primary regulation system 530 (e.g., across the output winding first and second end terminals 572a and 572b) is thus controlled to be within a predetermined range centered about a target output AC power signal voltage level.

When configured as an uninterruptible power supply, the standby input terminals 526a and 526b of the sixth example power supply system 520 may be connected to the standby power system 564 such that the standby power system 564 is operatively connected to the primary transformer 540. Should the example power system 520 not form a part of an uninterruptible power supply, the second input windings 576 and standby input terminals 526a and 526b may be omitted.

The sixth example power supply system 520 thus regulates the voltage of the input AC power signal such that the output AC power signal is within predefined parameters. The sixth example power supply system 520 may be configured to use high efficiency linear transformers as the primary transformer 540 and the secondary transformer 550. The sixth example power supply system 520 thus can be configured to provide a regulated output AC power signal at efficiencies of between 95-98 percent. In the sixth example power supply system 520, the inductor L is not integrated into the secondary transformer 550.

VII. Seventh Example Embodiment

Figure 7:
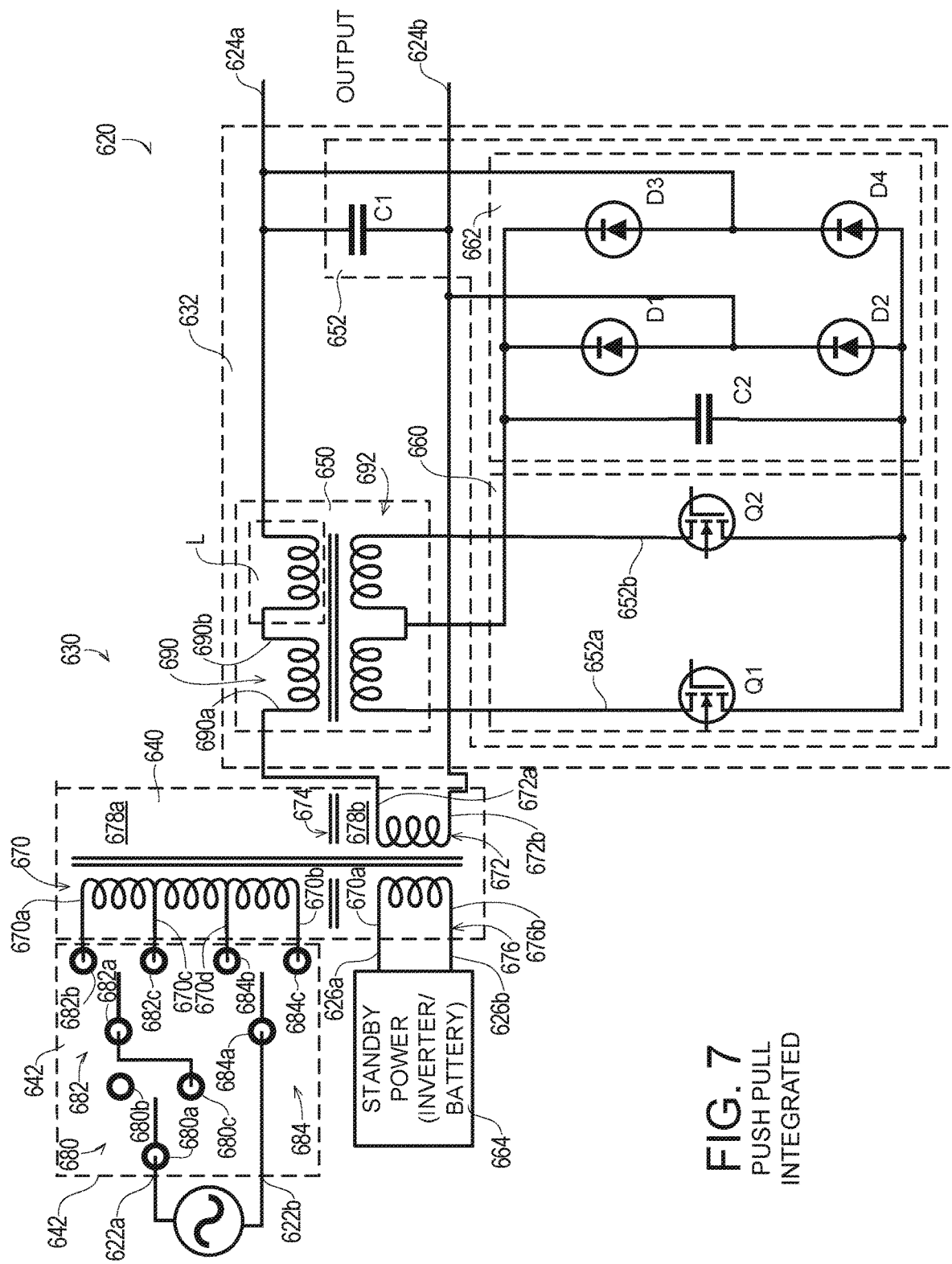
FIG. 7 is a schematic diagram illustrating a seventh example power supply system of the present invention.

FIG. 7 of the drawing illustrates a seventh example power supply system 620 comprising a primary regulation system 630, a secondary regulation system 632, and a controller (not shown). The controller of the seventh example power supply system 620 may be implemented in a manner similar to that of the controller 34 described above and will not be described herein in further detail.

FIG. 7 illustrates that the seventh example power supply system 620 defines input terminals 622a and 622b and output terminals 624a and 624b. The example power supply system 620 accepts an input AC power signal across the input terminals 622a and 622b and supplies an output AC power signal across the output terminals 624a and 624b. The seventh example power supply system 620 further comprises optional standby input terminals 626a and 626b.

The example primary regulation system 630 comprises a primary transformer 640 and a tap switch array 642. The example primary transformer 640 is a linear transformer. The example secondary regulation system 632 comprises a secondary transformer 650 and a regulating inverter 652. The secondary transformer 650 is a linear transformer arranged in series with the primary transformer 640. The regulating inverter 652 generates an adjustment power signal, and the secondary transformer 650 combines the adjustment power signal with the output of the primary transformer 640 to obtain the output AC power signal. The example regulating inverter 652 comprises a DC/AC converter 660 and an AC/DC converter 662.

The seventh example power supply system 620 may be embodied as or form a part of an uninterruptible power supply. When configured as an uninterruptible power supply, the seventh example power supply system 620 further optionally comprises a standby power system 664 that is operatively connected to the primary transformer 640. The standby power system 664 may comprise one or more of a battery and inverter, a generator, a solar power system, and the like. Should the input AC power signal be absent or outside of a predetermined operating range, the input 622a and 622b may be disconnected from the primary transformer 640, and the output power AC signal may be generated based on a standby AC power signal generated by the standby power supply system 620.

The seventh example power supply system 620 thus regulates the voltage of the input AC power signal such that the output AC power signal is within predefined parameters. The seventh example power supply system 620 may be configured to use high efficiency linear transformers as the primary transformer 640 and the secondary transformer 650. The seventh example power supply system 620 thus can be configured to provide a regulated output AC regional power signal at efficiencies of approximately 95-98 percent.

In particular, the primary regulation system 630 is configured to regulate a voltage of the output AC power signal within a first voltage range. The secondary regulation system 632 is configured to regulate the voltage of the output AC power signal within a second voltage range. The second voltage range is smaller than the first voltage range. If the seventh example power supply system 620 is configured to provide power in the context of a broadband communications system, the output AC voltage power signal should not exceed 90 volts. The primary regulation system 630 thus allows the seventh example power supply 620 adapt at a slow rate (e.g., twice a day) to relatively large voltage fluctuations (e.g., ±5 volts). The secondary regulation system 632, on the other hand, allows the seventh example power supply system 620 to regulate the output AC voltage, within certain parameters, to accommodate small voltage fluctuations (e.g., ±2 volts) of the input AC power signal at high frequency or substantially in real time. In the seventh example power supply system 620, the example first voltage range is approximately ±5 volts, and the example second voltage range is approximately ±2 volts. These ranges are provided by way of example only and may vary based on the requirements of a particular power supply environment.

The example primary transformer 640 comprises primary input windings 670, output windings 672, a shunt 674, and, optionally, secondary input windings 676. The primary input windings are arranged on a first side 678a of the shunt 674, while the output windings 672 and optional secondary input windings 676 are arranged on a second side 678b of the shunt 674. The example primary input windings 670 define primary input winding first and second end taps 670a and 670b and primary input winding first and second intermediate taps 670c and 670d. The example output windings 672 define output winding first and second end taps 672a and 672b. The example optional secondary windings 676 define secondary winding first and second end taps 676a and 676b. If used, the first and second end taps 676a and 676b are connected to the standby input terminals 626a and 626b.

The example tap switch array 642 comprises a first switch 680, a second switch 682, and a third switch 684. The example switches 680, 682, and 684 are single-pull double-through (SPDT) switches that can be controlled by the controller, operated manually, or both controlled by the controller and operated manually. The first switch 680 defines a first switch main terminal 680a, a first switch first contact terminal 680b, and a first switch second contact terminal 680c. The second switch 682 defines a second switch main terminal 682a, a second switch first contact terminal 682b, and a second switch second contact terminal 682c. The third switch 684 defines a third switch main terminal 684a, a third switch first contact terminal 684b, and a third switch second contact terminal 684c. The example secondary transformer 650 comprises first windings 690 and second windings 692. The example first windings 690 define first winding first and second end taps 690a and 690b. The example second windings 692 define second winding first and second end taps 692a and 692b and an intermediate tap 692c.

The example DC/AC converter 660 comprises MOSFETs Q1 and Q2, an inductor L, and an output capacitor C1. In the seventh example power supply 620, the inductor L is internal to the secondary transformer 650. The example AC/DC converter 662 comprises diodes D1-D4 configured as a rectifier and a rectifier capacitor C2. The DC/AC converter 660 defines first and second inverter terminals 652a and 652b. The example DC/AC converter 660 and the example AC/DC converter 662 operate as a full-bridge rectifier/push-pull converter that is or may be conventional and thus will not be described herein in detail. An optional filter capacitor (not shown) may be arranged to filter the output of the converter 660.

The first switch main terminal 680a is connected to the first primary input terminal 622a. The first switch first contact terminal 680b is not connected to any other terminal, allowing the first switch to disconnect the power system from the input. The first switch second contact terminal 680c is connected to the second switch main terminal 682a. The second switch first contact terminal 682b is connected to the primary winding first end tap 670a. The second switch second contact terminal 682c is connected to the primary winding first intermediate tap 670c. The third switch main terminal 684a is connected to the second primary input terminal 622b. The third switch first contact terminal 684b is connected to the primary winding second intermediate tap 670d. The third switch second contact terminal 684c is connected to the primary winding second end tap 670b. The output winding first end tap 672a is connected to the first winding first end tap 690a. The output winding second end tap 672b is connected to the second output terminal 624b. The first winding second end tap 690b is connected to the first output terminal 624a. The second winding first end tap 692a is connected to one end of the inverter capacitor C1. The second winding first and second end terminals 692a and 692b are connected to the first and second inverter output terminals 652a and 652b.

The AC/DC converter 662 formed by the rectifier diodes D1-D4 and rectifier capacitor C2 is connected across the output terminals 624a and 624b such that a DC signal is present at the DC/AC converter 660. The switches formed by the MOSFETS Q1 and Q2 are controlled (e.g., pulse-width modulated) based on the voltage of the output AC power signal or a voltage indicative of or proportional to the output AC power signal to generate the regulated power signal across the inverter output terminals 652a and 652b. The regulated power signal is applied across the second windings 692 of the secondary transformer 650 and are thus added to the adjustment AC power signal across the output winding first and second end terminals 672a and 672b. The sum of the voltage of the adjustment AC power signal and base AC power signal generated by the primary regulation system 620 (e.g., across the output winding first and second end terminals 672a and 672b) is thus controlled to be within a predetermined range centered about a target output AC power signal voltage level.

When configured as an uninterruptible power supply, the standby input terminals 626a and 626b of the seventh example power supply system 620 may be connected to the standby power system 664 such that the standby power system 664 is operatively connected to the primary transformer 640. Should the example power system 620 not form a part of an uninterruptible power supply, the second input windings 676 and standby input terminals 626a and 626b may be omitted.

The seventh example power supply system 620 thus regulates the voltage of the input AC power signal such that the output AC power signal is within predefined parameters. The seventh example power supply system 620 may be configured to use high efficiency linear transformers as the primary transformer 640 and the secondary transformer 650. The seventh example power supply system 620 thus can be configured to provide a regulated output AC power signal at efficiencies of between 95-98 percent. In the seventh example power supply system 620, the inductor L is integrated into the secondary transformer 650.

VIII. Eighth Example Embodiment

Figure 8:
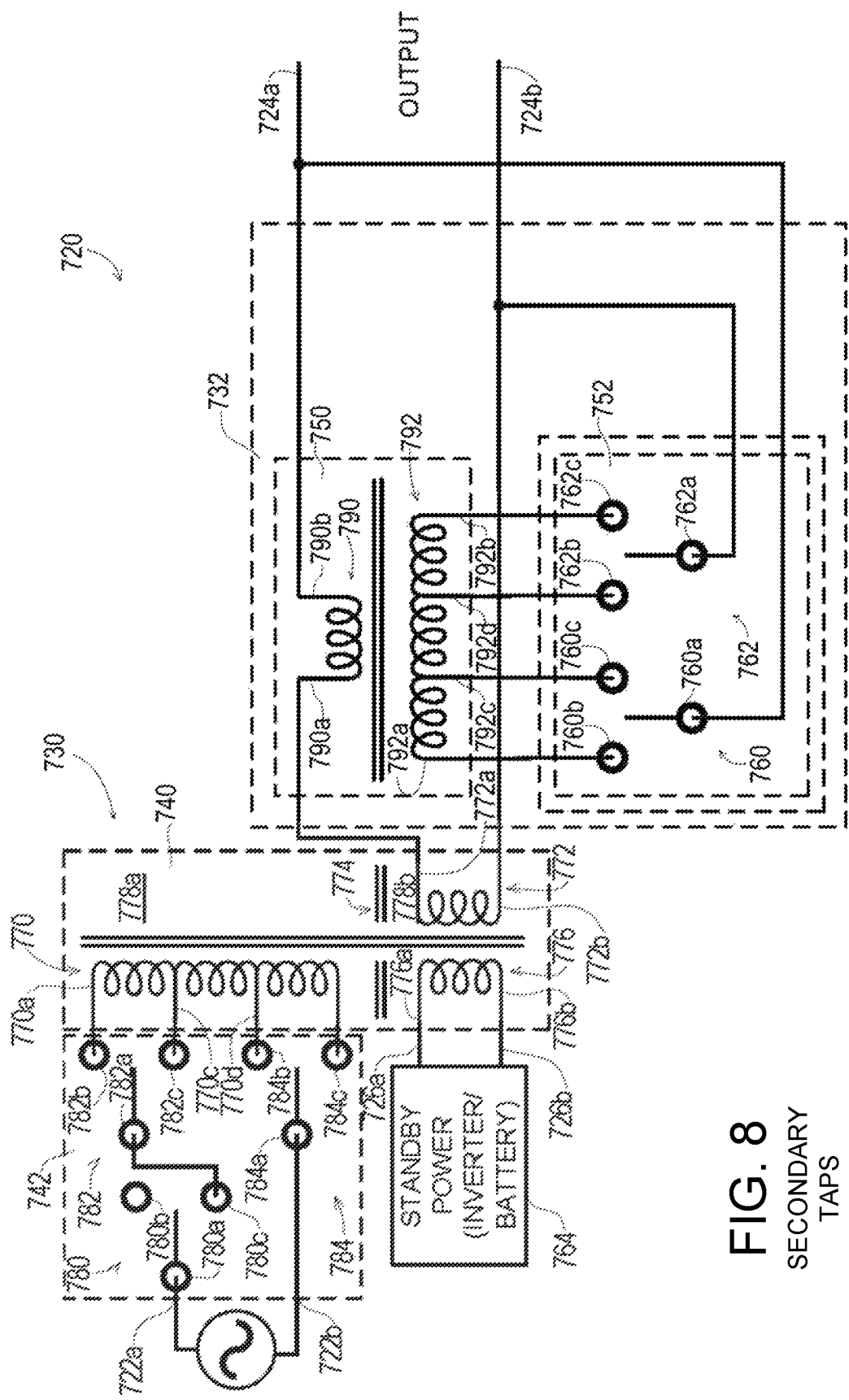
FIG. 8 is a schematic diagram illustrating an eighth example power supply system of the present invention.

FIG. 8 of the drawing illustrates a eighth example power supply system 720 comprising a primary regulation system 730, a secondary regulation system 732, and a controller (not shown). The controller of the eighth example power supply system 720 may be implemented in a manner similar to that of the controller 34 described above and will not be described herein in further detail.

FIG. 8 illustrates that the eighth example power supply system 720 defines input terminals 722a and 722b and output terminals 724a and 724b. The example power supply system 720 accepts an input AC power signal across the input terminals 722a and 722b and supplies an output AC power signal across the output terminals 724a and 724b. The eighth example power supply system 720 further comprises optional standby input terminals 726a and 726b.

The example primary regulation system 730 comprises a primary transformer 740 and a primary tap switch array 742. The example primary transformer 740 is a linear transformer. The example secondary regulation system 732 comprises a secondary transformer 750 and a secondary tap switch array 752. The secondary transformer 750 is a linear transformer arranged in series with the primary transformer 740. The secondary tap switch array 752 applies an adjustment power signal to the secondary transformer 750, and the secondary transformer 750 combines the adjustment power signal with the output of the primary transformer 740 to obtain the output AC power signal. The example secondary tap switch array 752 comprises a first secondary switch 760 and a second secondary switch 762. Limited regulation may be accomplished by a secondary tap switch array comprising a single secondary switch, and a secondary tap switch array comprising more than two switches (e.g., 3 or more) will provide finer regulation of the output AC power signal.

The eighth example power supply system 720 may be embodied as or form a part of an uninterruptible power supply. When configured as an uninterruptible power supply, the eighth example power supply system 720 further optionally comprises a standby power system 764 that is operatively connected to the primary transformer 740. The standby power system 764 may comprise one or more of a battery and inverter, a generator, a solar power system, and the like. Should the input AC power signal be absent or outside of a predetermined operating range, the input 722a and 722b may be disconnected from the primary transformer 740, and the output power AC signal may be generated based on a standby AC power signal generated by the standby power supply system 764.

The eighth example power supply system 720 thus regulates the voltage of the input AC power signal such that the output AC power signal is within predefined parameters. The eighth example power supply system 720 may be configured to use high efficiency linear transformers as the primary transformer 740 and the secondary transformer 750. The eighth example power supply system 720 thus can be configured to provide a regulated output AC regional power signal at efficiencies of approximately 95-98 percent.

In particular, the primary regulation system 730 is configured to regulate a voltage of the output AC power signal within a first voltage range. The secondary regulation system 732 is configured to regulate the voltage of the output AC power signal within a second voltage range. The second voltage range is smaller than the first voltage range. If the eighth example power supply system 720 is configured to provide power in the context of a broadband communications system, the output AC voltage power signal should not exceed 90 volts. The primary regulation system 730 thus allows the eighth example power supply 720 adapt at a slow rate (e.g., twice a day) to relatively large voltage fluctuations (e.g., ±5 volts). The secondary regulation system 732, on the other hand, allows the eighth example power supply system 720 to regulate the output AC voltage, within certain parameters, to accommodate small voltage fluctuations (e.g., ±2 volts) of the input AC power signal at high frequency or substantially in real time. In the eighth example power supply system 720, the example first voltage range is approximately ±5 volts, and the example second voltage range is approximately ±2 volts. These ranges are provided by way of example only and may vary based on the requirements of a particular power supply environment.

The example primary transformer 740 comprises primary input windings 770, output windings 772, a shunt 774, and, optionally, secondary input windings 776. The primary input windings are arranged on a first side 778a of the shunt 774, while the output windings 772 and optional secondary input windings 776 are arranged on a second side 778b of the shunt 774. The example primary input windings 770 define primary input winding first and second end taps 770a and 770b and primary input winding first and second intermediate taps 770c and 770d. The example output windings 772 define output winding first and second end taps 772a and 772b. The example optional secondary windings 776 define secondary winding first and second end taps 776a and 776b.

If used, the first and second end taps 776a and 776b are connected to the standby input terminals 726a and 726b.

The example primary tap switch array 742 comprises a first primary switch 780, a second primary switch 782, and a third primary switch 784. The example primary switches 780, 782, and 784 are single-pull double-through (SPDT) switches that can be controlled by the controller, operated manually, or both controlled by the controller and operated manually. The first primary switch 780 defines a first primary switch main terminal 780a, a first primary switch first contact terminal 780b, and a first primary switch second contact terminal 780c. The second primary switch 782 defines a second primary switch main terminal 782a, a second primary switch first contact terminal 782b, and a second primary switch second contact terminal 782c. The third primary switch 784 defines a third primary switch main terminal 784a, a third primary switch first contact terminal 784b, and a third primary switch second contact terminal 784c. The example secondary transformer 750 comprises first windings 790 and second windings 792. The example first windings 790 define first winding first and second end taps 790a and 790b. The example second windings 792 define second winding first and second end taps 792a and 792b and second winding first and second intermediate taps 792c and 792d.

The example first and second secondary switches 760 and 762 of the example secondary tap switch array 752 are single-pull double-through (SPDT) switches that can be controlled by the controller, operated manually, or both controlled by the controller and operated manually. The first secondary switch 760 defines a first secondary switch main terminal 760a, a first secondary switch first contact terminal 760b, and a first secondary switch second contact terminal 760c. The second secondary switch 762 defines a second secondary switch main terminal 762a, a second secondary switch first contact terminal 762b, and a second secondary switch second contact terminal 762c. An optional filter capacitor (not shown) may be arranged to filter the output of the converter 760.

The first primary switch main terminal 780a is connected to the first primary input terminal 722a. The first primary switch first contact terminal 780b is not connected to any other terminal, allowing the first switch to disconnect the power system from the input. The first primary switch second contact terminal 780c is connected to the second primary switch main terminal 782a. The second primary switch first contact terminal 782b is connected to the primary winding first end tap 770a. The second primary switch second contact terminal 782c is connected to the primary winding first intermediate tap 770c. The third primary switch main terminal 784a is connected to the second primary input terminal 722b. The third primary switch first contact terminal 784b is connected to the primary winding second intermediate tap 770d. The third primary switch second contact terminal 784c is connected to the primary winding second end tap 770b. The output winding first end tap 772a is connected to the first winding first end tap 790a. The output winding second end tap 772b is connected to the second output terminal 724b.

The first winding first end tap 790a of the secondary transformer 750 is connected to the output windings first end tap 772a of the primary transformer 740. The first winding second end tap 790b is connected to the first output terminal 724a. The second winding first end tap 792a of the secondary transformer 750 is connected to the first contact terminal 760a of the first secondary switch 760. The second winding second end tap 792b of the secondary transformer 750 is connected to the second contact terminal 762b of the second secondary switch 762. The second winding first intermediate tap 792c of the secondary transformer 750 is connected to the second contact terminal 760c of the first secondary switch 760. The second winding second intermediate tap 792d of the secondary transformer 750 is connected to the first contact terminal 762a of the second secondary switch 762. The first secondary switch main terminal 760a is connected to the second output terminal 724b, and the second secondary switch main terminal 762a is connected to the first output terminal 724a.

The first and second secondary switches 760 and 762 may be operated to connect the output AC power signal present across the output terminals 724a and 724b across a portion of the second winding 792 to define an adjustment AC power signal that is added to the output of the primary regulation system 730 to obtain the output AC power signal.

The regulated power signal is applied across the second windings 792 of the secondary transformer 750 and are thus added to the adjustment AC power signal across the output winding first and second end terminals 772a and 772b. The sum of the voltage of the adjustment AC power signal and base AC power signal generated by the primary regulation system 720 (e.g., across the output winding first and second end terminals 772a and 772b) is thus controlled to be within a predetermined range centered about a target output AC power signal voltage level.

As generally discussed above, a secondary tap switch array comprising fewer (e.g., one) secondary switches would allow less granular regulation of the output AC power signal than the eighth example power supply 720 described herein, and a secondary tap switch array comprising more (e.g., three or more) secondary switches would allow more granular regulation of the output AC power signal than the eighth example power supply 720.

When configured as an uninterruptible power supply, the standby input terminals 726a and 726b of the eighth example power supply system 720 may be connected to the standby power system 764 such that the standby power system 764 is operatively connected to the primary transformer 740. Should the example power system 720 not form a part of an uninterruptible power supply, the second input windings 776 and standby input terminals 726a and 726b may be omitted.

The eighth example power supply system 720 thus regulates the voltage of the input AC power signal such that the output AC power signal is within predefined parameters. The eighth example power supply system 720 may be configured to use high efficiency linear transformers as the primary transformer 740 and the secondary transformer 750. The eighth example power supply system 720 thus can be configured to provide a regulated output AC power signal at efficiencies of between 95-98 percent.

What is claimed is:

1. A power supply system for generating an output power signal comprising:
   a primary regulation system comprising a primary transformer and a primary tap switch array;
   a secondary regulation system comprising a secondary transformer and an adjustment power signal generator; and
   a controller; wherein
   the primary tap switch array is configured to regulate a base power signal from the primary transformer such that the output power signal is regulated within a first voltage range;
   the controller is configured to control the adjustment power signal generator such that the adjustment power signal generator generates an adjustment power signal;
   the secondary transformer is configured to combine the adjustment power signal with the base power signal from such that the output power signal is regulated within a second voltage range; and
   the second voltage range is smaller than the first voltage range.

2. A power supply system as recited in claim 1, in which the secondary regulation system comprises an AC/AC converter.

3. A power supply system as recited in claim 2, in which a DC/AC converter comprises an inductor that is integrated with the secondary transformer.

4. A power supply as recited in claim 2, in which the AC/AC converter comprises an AC/DC converter and a DC/AC converter.

5. A power supply system as recited in claim 1, in which the secondary regulation system comprises a full-bridge rectifier and a DC/AC converter.

6. A power supply system as recited in claim 5, in which the DC/AC converter comprises an inductor that is integrated with the secondary transformer.

7. A power supply system for providing an output power signal to an output from an input power signal at an input comprising: a primary regulation system comprising a primary transformer and a primary tap switch array; a secondary regulation system comprising a secondary transformer and an adjustment power signal generator; and a controller; wherein the primary regulation system is configured to generate a base power signal based on the input power signal, where the primary regulation system regulates the base power signal such that the output power signal is regulated within a first voltage range; the controller is configured to control the adjustment power signal generator to such that the adjustment power signal generator generates an adjustment power signal; the secondary transformer is configured to combine the adjustment power signal with the base power supply signal to obtain the output power signal such that the output power signal is regulated within a second voltage range; and the second voltage range is smaller than the first voltage range.

8. A power supply system as recited in claim 7, in which the secondary regulation system comprises an AC/AC converter.

9. A power supply system as recited in claim 8, in which a DC/AC converter comprises an inductor that is integrated with the secondary transformer.

10. A power supply as recited in claim 8, in which the AC/AC converter comprises an AC/DC converter and a DC/AC converter.

11. A method of providing an output power signal to an output from an input power signal at an input comprising:
    arranging a primary transformer and a primary tap switch array to form a primary regulation system;
    arranging a secondary transformer and an adjustment power signal generator to form a secondary regulation system;
    controlling the primary tap switch array such that the primary regulation system generates a base power signal based on the input power signal, where the base power signal is regulated by the primary tap switch array such that the output power signal is regulated within a first voltage range;
    controlling the adjustment power signal generator to generate an adjustment power signal;

applying the adjustment power signal to the secondary transformer such that the adjustment power signal is combined with the base power signal such that the output power signal is regulated within a second voltage range, where the second voltage range is smaller than the first voltage range.

\* \* \* \* \*